United States Patent [19]

Yoshioka et al.

[11] Patent Number: 5,474,146
[45] Date of Patent: Dec. 12, 1995

[54] SNOW VEHICLE

[75] Inventors: Toshiharu Yoshioka; Takashi Ohzeki; Hideaki Suzuki; Takumi Tottori; Munehito Nakamura; Mamoru Matsui; Michio Ohkubo; Kanau Iwashita, all of Saitama, Japan

[73] Assignee: Honda Giken Kogyo Kabushiki Kaisha, Tokyo, Japan

[21] Appl. No.: 24,830

[22] Filed: Mar. 1, 1993

Related U.S. Application Data

[63] Continuation of Ser. No. 608,489, Oct. 19, 1990, abandoned, which is a continuation-in-part of Ser. No. 437,196, Nov. 16, 1989, abandoned.

[30] Foreign Application Priority Data

| Dec. 6, 1988 | [JP] | Japan | 63-307042 |
| Apr. 1, 1989 | [JP] | Japan | 1-83100 |
| Jul. 3, 1989 | [JP] | Japan | 1-172726 |
| Dec. 18, 1989 | [JP] | Japan | 1-327683 |
| Feb. 5, 1990 | [JP] | Japan | 2-25583 |

[51] Int. Cl.$^6$ ................................ B62D 55/06
[52] U.S. Cl. .................. 180/184; 180/190; 180/9.25; 280/608; 305/35 EB
[58] Field of Search .................. 180/182, 184, 180/190, 192, 193, 231, 185, 9.25; 280/21.1, 608, 855; 305/35 R, 35 EB, 56, 57, 24

[56] References Cited

U.S. PATENT DOCUMENTS

| Re. 28,423 | 5/1975 | Higginbotham | 180/5 R |
| 1,542,625 | 6/1925 | MacGown et al. | 180/185 |
| 2,258,778 | 10/1941 | Lewis | 180/231 |
| 3,063,728 | 11/1962 | Patterson | 280/608 |
| 3,083,977 | 4/1963 | Dunston | 280/11.13 |
| 3,252,533 | 5/1966 | Aeder et al. | 180/5 |
| 3,318,403 | 5/1967 | Hansen | 180/185 |
| 3,485,312 | 12/1969 | Swenson et al. | 180/5 |
| 3,508,796 | 4/1970 | Paulson et al. | 305/38 |
| 3,592,279 | 7/1971 | Donelson, Jr. | 180/5 |
| 3,619,012 | 11/1971 | Bizier | 305/38 |
| 3,645,347 | 2/1972 | Brant | 280/608 |
| 3,673,884 | 7/1972 | Southiere | 74/242.11 |
| 3,675,939 | 7/1972 | Vik | 280/28 |
| 3,684,045 | 8/1972 | Samuelson | 180/5 |
| 3,734,532 | 5/1973 | Mattson | 280/150 |

(List continued on next page.)

FOREIGN PATENT DOCUMENTS

| 0391282 | 10/1990 | European Pat. Off. . |
| 2093248 | 1/1972 | France . |
| 49-10603 | 3/1974 | Japan . |
| 58-39581 | 3/1983 | Japan . |
| 58-136581 | 8/1983 | Japan . |
| 59-18083 | 1/1984 | Japan . |
| WO87/01085 | 2/1987 | WIPO . |

Primary Examiner—Anne Marie Boehler
Attorney, Agent, or Firm—Lyon & Lyon

[57] ABSTRACT

A snow vehicle of the saddle-riding type utilizes essentially the same upper structure as a motorcycle but mounts a ski on the front fork for steering and an engine-driven endless belt track assembly for powering the device. The endless belt track assembly is arranged for mounting on a rear arm structure in order to maintain surface contact between the endless belt and the snow and thereby improve the operating efficiency of the vehicle. The arm may be pivotally mounted or integral with a rear fork pivotally mounted to the vehicle. An improved endless belt construction is described in which the belt is strengthened by core members and the driving cogs of particular configuration and disposed at prescribed locations with respect to the propelling lugs in order to maintain surface contact between the belt edge and the snow surface during cornering. Also disclosed are various forms of cover structures for the track assembly that prevent the scattering of snow from the belt onto the rider or vehicle parts. Grab rails attached to the rear swing arm elements facilitate manipulation of the vehicle in confined spaces. A stopper belt adjustment is also shown mounted to a rear fork with the stopper belt extruding to an articulated rear swing arm structure. The adjustment accommodates for adjustments to the drive chain for tensioning.

46 Claims, 30 Drawing Sheets

U.S. PATENT DOCUMENTS

| | | | |
|---|---|---|---|
| 3,913,486 | 10/1975 | Schaffner | 305/57 |
| 3,930,689 | 1/1976 | Maki | 305/35 |
| 4,116,496 | 9/1978 | Scott | 180/190 |
| 4,194,583 | 3/1980 | Aaen | 180/190 |
| 4,222,453 | 9/1980 | Fixsen et al. | 180/193 |
| 4,237,744 | 12/1980 | Jolly | 474/116 |
| 4,442,913 | 4/1984 | Grinde | 180/190 |
| 4,502,560 | 3/1985 | Hisatomi | 180/190 |
| 4,520,890 | 6/1985 | Marier | 180/193 |
| 4,546,842 | 10/1985 | Yasui | 180/193 |
| 4,613,006 | 9/1986 | Moss et al. | 180/9.25 |
| 4,614,507 | 9/1986 | Ishino | 464/101 |
| 4,616,729 | 10/1986 | Kasai | 180/231 |
| 4,650,026 | 3/1987 | Shiraishi | 180/227 |
| 4,714,125 | 12/1987 | Stacy, Jr. | 180/182 |
| 4,719,983 | 1/1988 | Bruzzone | 180/184 |
| 4,768,794 | 9/1988 | Bibollet | 280/21 |
| 5,007,497 | 4/1991 | Trema | 180/219 |

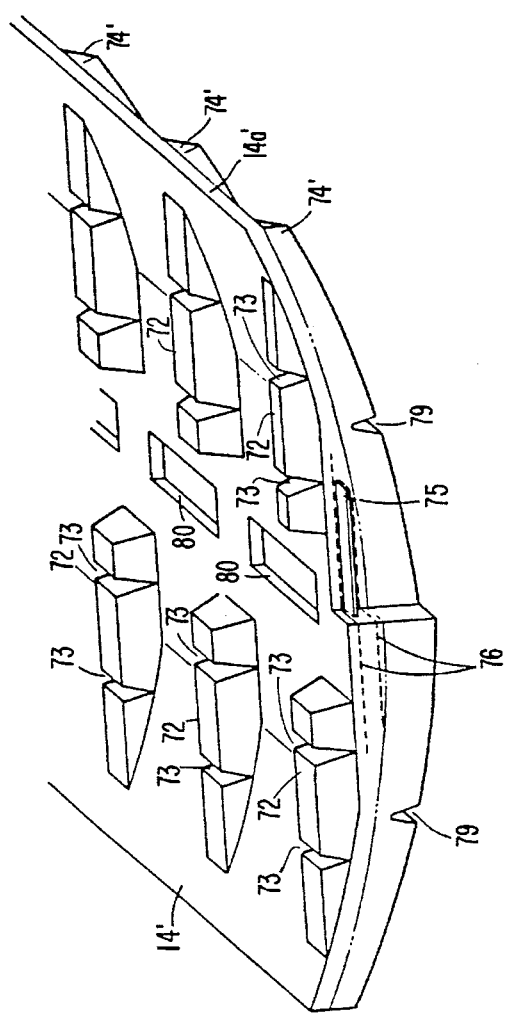
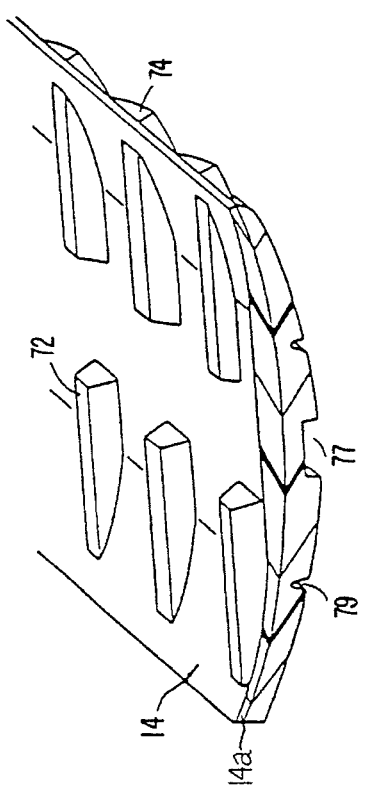

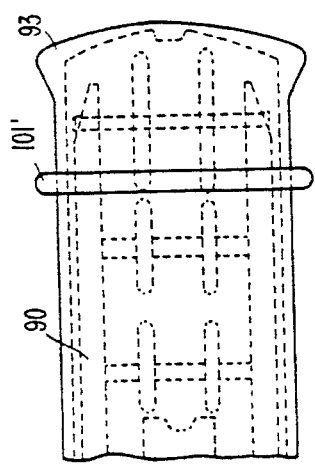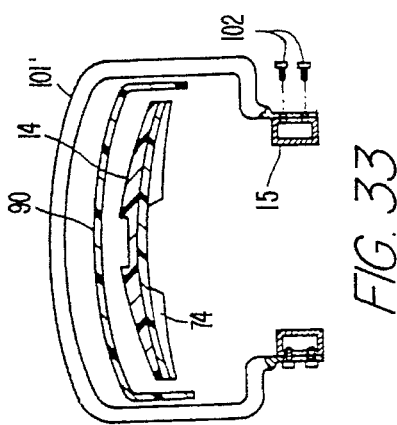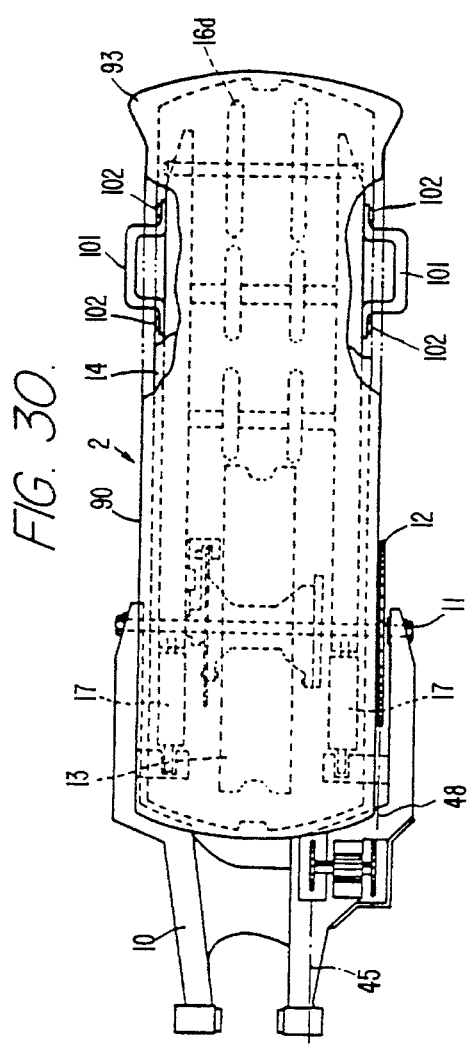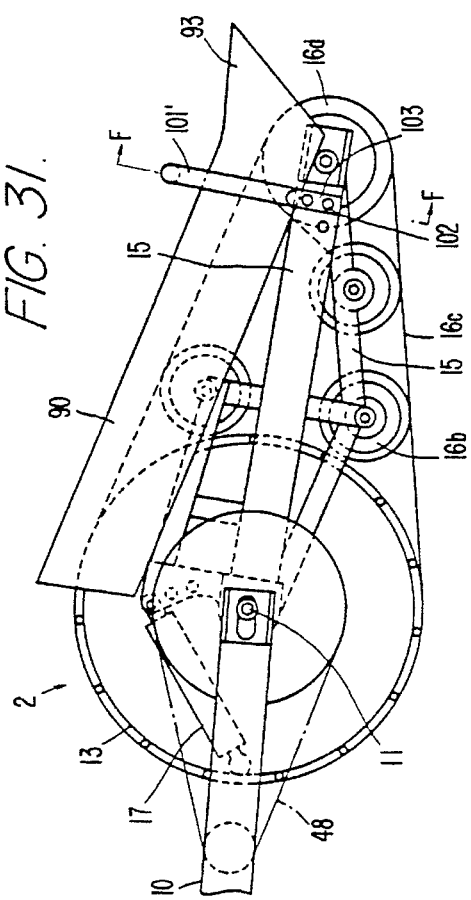

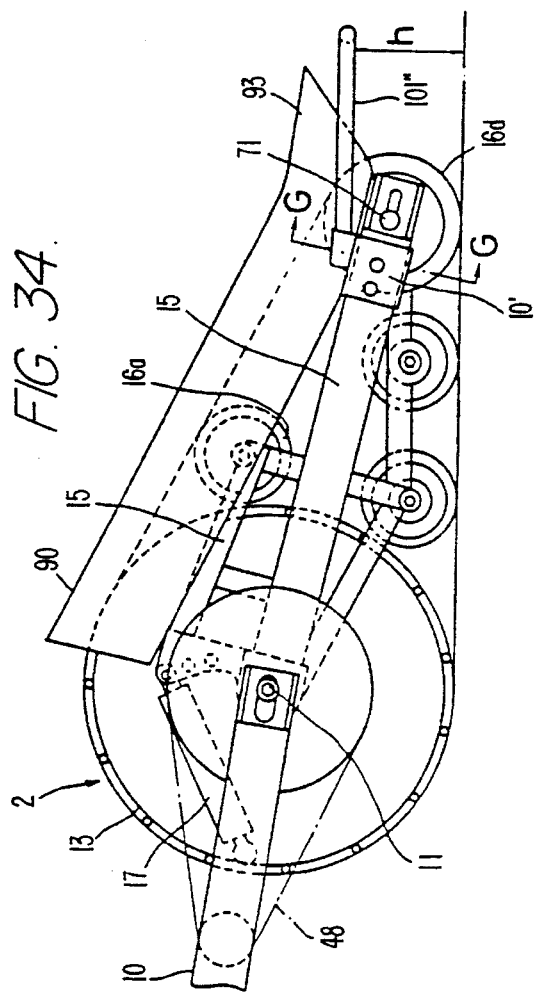
FIG. 34.
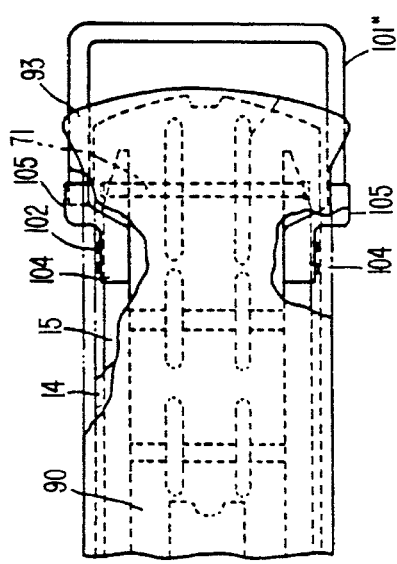
FIG. 35.
FIG. 36.

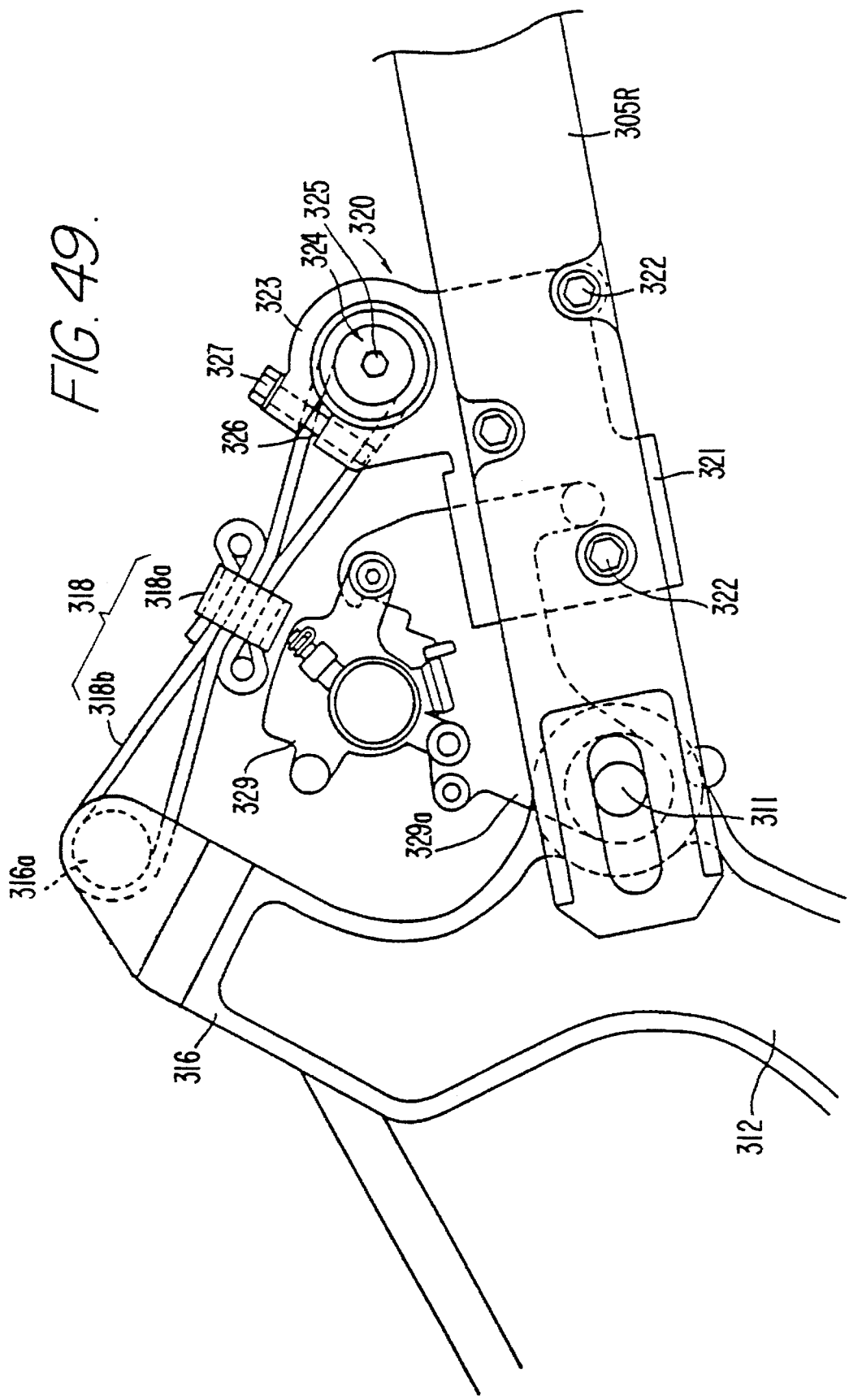

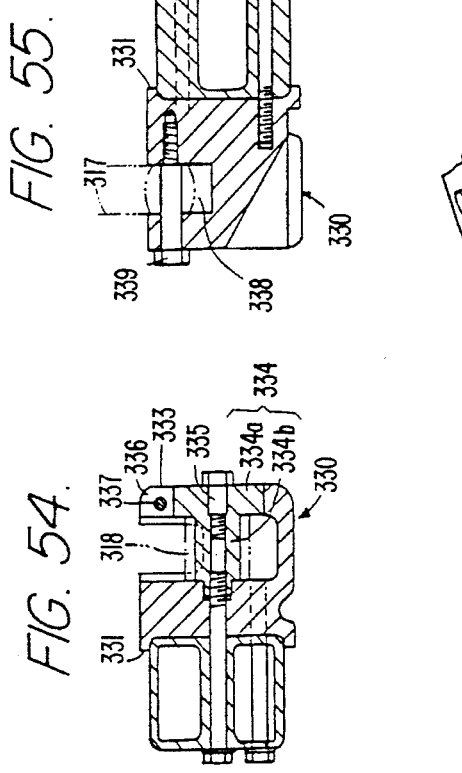
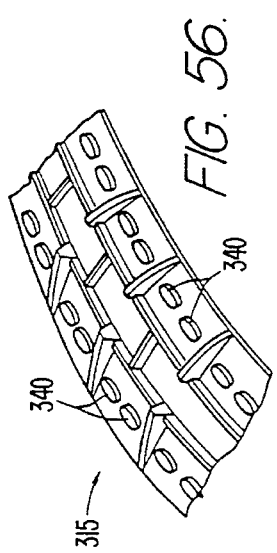
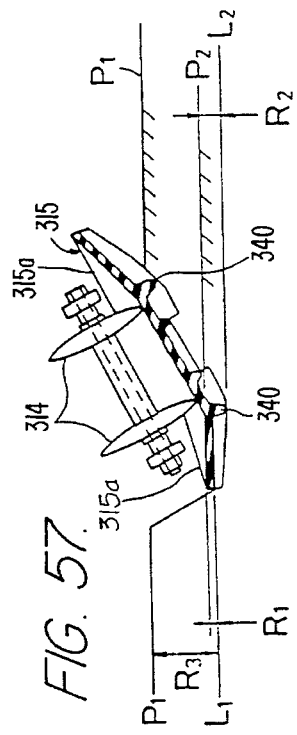
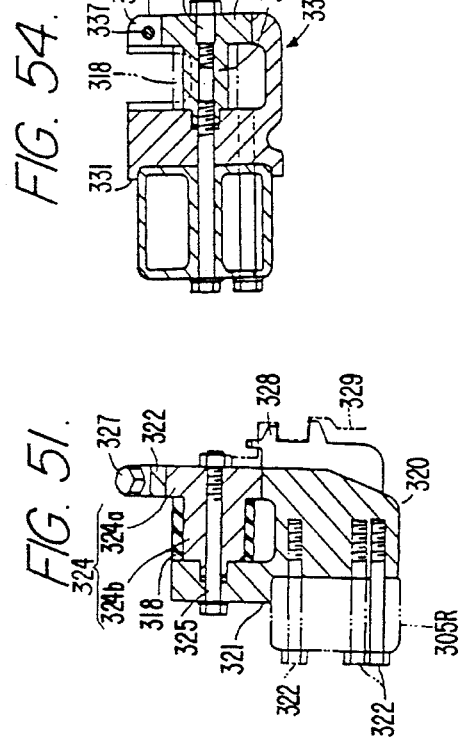
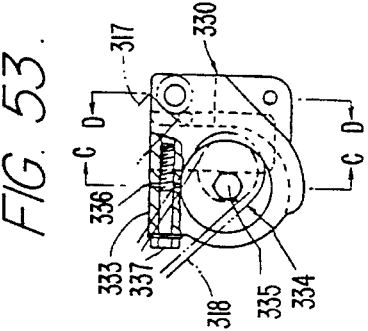
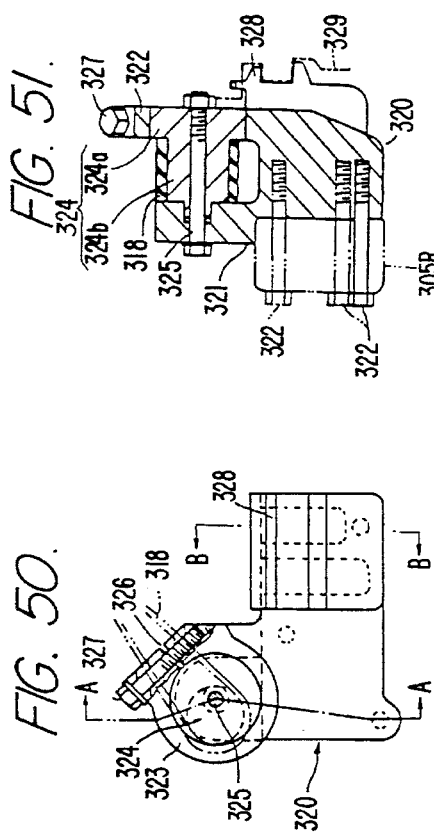
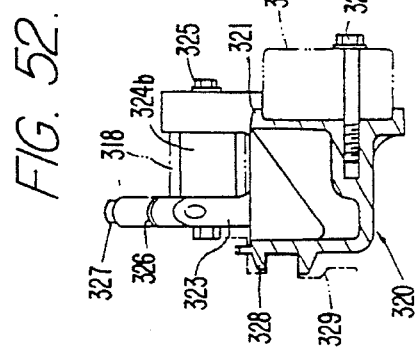

SNOW VEHICLE

RELATED APPLICATION

This application is a continuation of application Ser. No. 07/608,489, filed Oct. 19, 1990, now abandoned, which is a continuation-in-part of U.S. Pat. No. 07/437,196, filed Nov. 16, 1989, now abandoned.

BACKGROUND OF THE INVENTION

The present invention relates to a saddle-riding type compact snow vehicle having substantially the same upper frame structure as a motorcycle and mounting a steering ski instead of a front wheel of the motorcycle and an endless track type driving device instead of a rear wheel of the motorcycle.

As is known in the prior art (e.g., U.S. Pat. No. 4,613,006), an endless track vehicle, such as a snow vehicle, is provided with a steering ski at a front portion of the vehicle body and with an endless track device having an endless track belt at a rear portion of the vehicle body. The endless track device is driven by an engine, and it includes a driving wheel and a guide roller both mounted on swing arms swingably supported to the rear portion of the vehicle body. The endless track belt is wrapped around the driving wheel and the guide roller.

In the above construction of the vehicle, the endless track device and the swing arms are swung about a pivotal portion relative to the vehicle body frame, causing fluctuation in the contact area of the endless track belt against a snow surface, or the like. When the vehicle is driven in deep snow, the snow is dug by the rotative driving of the endless track device, resulting in a phenomenon such that the vehicle body of the snow vehicle, except the endless track device, comes into contact with the snow surface, and the endless track device is caused to idly operate in the snow (such a phenomenon will hereinafter be referred to as "stack"). Accordingly, it is necessary to prevent the stack as mentioned above.

Further, an amount of lateral projection of the rear fork and the rear arms in the prior art snow vehicle is large, causing interference with standing trees, or the like, during travelling and interference with the snow surface upon turning of the vehicle. Accordingly, it is desired to avoid such interferences, thereby improving the ability of the vehicle to move upon passing through narrow areas and reducing its running resistance due to the snow. Furthermore, it is also necessary to smoothly steer the steering ski, so as to improve the running performance. Other compact saddle-type riding snow vehicles are also known in the prior art. For example, Japanese Patent Laid-Open Publication No. 58-39581 discloses an off-road running vehicle mounting a sled instead of a front wheel of a motorcycle and an endless track type travelling device instead of a rear wheel of the motorcycle. This vehicle is suitable for running on sandy or marshy land, and especially on a snow surface. The endless track type travelling device of this reference includes a wheel supporting frame, a driving wheel supported to a front portion of the frame, and a driven wheel supported to a rear portion of the frame. The wheel supporting frame is supported through rod members to an upper body frame provided at a rear portion of the vehicle body. The wheel supporting frame is formed at its front end with forwardly upwardly inclined arms which are pivotally supported to pivotal portions of swing arms of the motorcycle. The driving wheel is driven by an engine through chains. An endless track is wrapped between the driving wheel and the driven wheel. The endless track is comprised of an endless rubber belt with a toothed belt fixedly attached to an inner circumferential surface of the endless rubber belt and adapted to engage sprockets of the driving wheel and the driven wheel, and a plurality of metal lugs provided on an outer circumferential surface of the endless rubber belt and arranged at circumferentially equal intervals.

Another conventional snow vehicle is disclosed in Japanese Utility Model Publication No. 49-10603, for example. This snow vehicle includes a rear wheel of a motorcycle, a tension roller provided behind the rear wheel, and a flexible endless travelling belt wrapped between the rear wheel and the tension roller in such a manner as to define a triangular space therewithin. The flexible endless travelling belt provides a contact surface adapted to flatly contact the snow surface.

In turning a normal motorcycle, the vehicle body thereof is inclined to the side of the turning to thereby provide smooth turning motion; however, in turning the snow vehicle, as mentioned above, it is hard to incline the vehicle body of the snow vehicle since the contact surface of the endless belt contacting the snow surface is flat, and the width of the endless belt is normally large so as to reduce the contact pressure against the snow surface. If the vehicle body of the snow vehicle is inclined upon turning, an outer-diameter side portion of the contact surface is separated from the snow surface, and only an inner-diameter side portion of the contact surface contacts the snow surface. As a result, the contact pressure is increased, and the driving or propelling force is reduced. Further, as the endless belt having a large width is inclined, the center of gravity of the vehicle body is vertically varied, thereby reducing the riding comfort of the driver.

To solve this problem, there has been proposed in Japanese Patent Laid-Open Publication Nos. 59-18083 and 58-136581 a snow vehicle having a rocking mechanism for transversely rocking the vehicle body relative to an endless track or belt. However, this rocking mechanism is complex and the turning performance of vehicles employing it is not satisfactory since the entire width of the endless track remains in contact with the snow surface.

Also addressed is the problem of providing a cover for an endless track belt so as to prevent snow, or the like, from being caught up by the endless track belt during its operation and scattered against the rider and vehicle components. In a device with articulation between elements of the apparatus that are covered such that the swing arms and the rear arms are arranged to swing with respect to each other, it is necessary to define a large space between the track belt and the track belt cover, if the track belt cover is mounted to the swing arms in a conventional manner. Consequently, the scattering of snow, or the like, caught up by the track belt cannot be adequately prevented.

It is accordingly an object of the present invention to provide a snow vehicle having improved running performance.

It is another object of the present invention to provide a saddle-riding type compact snow vehicle, wherein the endless track can readily follow the inclination of the vehicle body, and a contact area of the endless track contacting the snow surface can be increased to prevent an increase in contact pressure and a decrease in driving force upon turning of the vehicle.

According to still another object of the present invention, a track belt cover is provided in such a vehicle which can effectively prevent the scattering of the snow, or the like.

SUMMARY OF THE INVENTION

According to the present invention there is provided a snow vehicle comprising a front fork, a steering ski supported by a lower portion of the front fork, a rear fork supported at its front end portion through a shaft by the vehicle body frame, and a driving wheel supported through a rear axle by right and left rear end portions of the rear fork. A guide wheel is supported through a shaft with respect to the rear fork, and an endless belt is wrapped between the driving wheel and the guide wheel. To maintain the contact area of the belt relatively constant with respect to a snow surface there are provided a pair of rearwardly extending right and left rear arms having front end portions supported to the rear end portions of the rear fork. In a first embodiment, the arms are pivotally mounted at the drive axle. In a second, the arms are fixed to the rear fork. The guide wheel is mounted to the rear arms, and, desirably, the rear arms are disposed laterally inside of the rear fork.

With the integral rear fork and rear arm embodiment, the rear end portions of the rear fork may be bent inwardly to extend into the inside space defined by the endless belt, and the guide wheels may be supported to the rear end portions. The rear fork is integrally formed with the rear arms to eliminate any connection of the rear arms on the lateral outside surfaces of the rear fork. Therefore, lateral projections of the supporting portion from the lateral opposite sides of the endless belt for supporting the guide wheels can be reduced, making the driving device slim in the lateral direction. Furthermore with integral rear arms connected to the rear fork, the number of parts and the number of assembly steps can be reduced.

The snow vehicle may include a pair of right and left steps projecting laterally outwardly from the vehicle body frame, wherein a maximum width of the rear fork is set to be substantially equal to a lateral distance between the steps.

The rear arms, a sub-cushion extending between the rear fork and the rear arms, and a brake device for the driving wheel may be accommodated inside the endless belt where the rear arms are pivotally mounted relative to the rear fork.

The maximum width of the endless belt may be set to be substantially equal to an inner dimension between right and left arm portions of the rear fork. Also, the snow vehicle may include a driven member provided laterally outside of the driving wheel for transmitting the driving force to the driving wheel, wherein the right or left front end portion of the rear arms is disposed laterally between the driving wheel and the driven member.

Still other advantages include:

the vertical position of the rear axle of the driving wheel may be set to be higher than the minimum road clearance of the vehicle body of the snow vehicle under the condition that an operator rides the snow vehicle;

the axle weight to be applied to the rear axle may be set to be substantially equal to an axle weight to be applied to the shaft for supporting the guide wheel;

the snow vehicle may include a ski bracket for mounting the steering ski to the front fork and a ski axle for supporting the ski bracket to the steering ski, the ski axle being positioned so as to intersect a steering axis;

the snow vehicle may include an elastic member interposed between the ski bracket and the steering ski;

the ski bracket may be mounted at its upper portion to the brake caliper mounting portion and the front axle mounting portion both formed on the front fork for adaptation to a motorcycle;

the snow vehicle may include a front sub-cushion having one end mounted to the steering ski and the other end mounted to the front fork, wherein the mounting portion for mounting the one end of the front sub-cushion to the steering ski is positioned behind the steering axis; and the snow vehicle may include right and left edge members mounted to opposite sides of the steering ski, wherein the mounting position of each of the edge members is adjustable.

As the rear arms of the endless track device may be disposed laterally inside of the rear fork, the width of the endless track device can be made smaller than that of the rear fork. As a result, the snow vehicle can easily pass through narrow areas, thus improving its passing ability.

As the maximum width of the rear fork may be set to be nearly equal to the lateral distance between the right and left steps, the vehicle body can be made slim, thereby reducing its running resistance.

As the rear arms, the brake caliper, the rear sub-cushion, etc., may be accommodated inside of the endless belt, the running resistance due to the snow can be further reduced.

As the width of the endless belt may be set to be nearly equal to the inner dimension between the right and left arm portions of the rear fork, the endless belt can be made wide, thereby reducing its contact pressure against the snow surface and improving anti-stack performance.

As the front end portion of the rear arm may be disposed laterally between the driving wheel and the driven member, the width of the endless belt can be made larger as compared with the case that the driven member is disposed laterally inside of the rear arm.

As the vertical position of the rear axle may be set to be higher than the minimum road clearance of the vehicle body when the operator rides the snow vehicle, the endless track device is prevented from digging to a great degree into the deep snow, thereby improving the anti-stack performance.

As the weight to be applied to the rear axle may be set to be substantially equal to the axle weight to be applied to the supporting shaft of the guide wheel, the contact area of the endless belt contacting the snow surface can be increased to thereby reduce the contact pressure. Accordingly, the digging of the endless track device into the snow can be reduced to improve the anti-stack performance.

As the ski axle may be positioned so as to intersect the steering axis, the steering load can be reduced.

As an elastic member may be interposed between the ski bracket and the steering ski, any impact upon the steering mechanism can be damped by the elastic member.

As a ski bracket may be mounted to the front fork by utilizing the mounting portions for mounting a brake caliper and a front axle in the case of a motorcycle, the mounting operation of the ski bracket can be easily carried out.

As the mounting portion for mounting one end of the front sub-cushion to the steering ski may be positioned behind the steering axis, a trail effect can be achieved, thus improving straight running ability.

As the mounting position of the edge members may be adjustable, the effectiveness of edging of the steering ski can be suitably controlled.

Also, the endless track-type driving device of the present invention can have an endless belt formed on its outer circumferential surface with a plurality of propelling lugs extending transversely of the endless belt and arranged at given intervals in a circumferential direction thereof. The endless belt includes a core member embedded therein at a transversely central position of the belt and having a transverse length shorter than the belt width. A plurality of thick-walled portions are formed on an inner surface of the endless belt at positions corresponding to the propelling lugs. Each of the thick-walled portions extend transversely from a position corresponding to a substantially transverse end of the core member toward the side edge of the belt. A notch is formed in each of the thick-walled portions at a position transversely outside of the substantially transverse end of the core member.

With this arrangement, the transversely central portion of each propelling lug is reinforced by the core member, and the transversely opposite portions of each propelling lug are given a sufficient stiffness by the thick-walled portions. Accordingly, a sufficient propelling force can be provided by the propelling lugs being forced into the snow. Particularly in the case of turning the vehicle, the endless belt can be readily deformed owing to the formation of the notch in each thick-walled portion, thereby easily following the inclination of the vehicle body. Accordingly, an inclined portion of the endless belt can be brought into substantially flat and wide contact with the snow surface. That is, a large contact area can be ensured even upon turning of the vehicle, and a sufficient propelling force can also be ensured by the propelling lugs. The thick-walled portions formed on the inner surface of the endless belt also serve as cogs for engaging a driving sprocket or the like.

For covering the track belt to prevent scattering of the snow a track belt cover can be disposed over the endless track device being mounted to the rear arms thereof. Alternatively, the track belt cover can comprise a front cover component mounted to the rear fork and a rear cover component mounted to the rear arms, the front cover component being relatively movable with respect to the rear cover component and being overlapped at its rear end portion by the front end portion of the rear cover component.

With the track belt cover of the invention being mounted to the rear arms, even when the rear arms are swung relative to the rear fork during running of the vehicle, the track belt cover is swung together with the rear arms. Therefore, the track belt cover can be located just over the track belt with a small gap defined therebetween. On the other hand, when the cover comprises front and rear components, the front cover component is swung together with the rear fork, and the rear cover component is swung together with the rear arms. That is, the front cover component is swingable relative to the rear cover component, and the front and upper portions of the track belt can be covered by the front cover component more extensively.

Desirably outlet openings for the discharge of snow can be formed through opposite side surfaces of the front cover component and a grab rail can be provided on the rear arms to assist in manipulating the rear end of the vehicle. By forming the outlet openings through the opposite side surfaces of the front cover component, snow, or the like, caught up by the track belt and led forwardly along the inside surface thereof can be discharged from the outlet openings, thereby preventing the snow, or the like, from staying inside the front cover component and preventing an increase in running resistance. Further, by mounting the grab rail on the rear arms, the endless track device can be easily lifted by gripping the grab rail when it is desired, for example, to change the travelling direction without being hindered by the track belt cover.

In the instance where a snow vehicle employs a rear arm pivotally mounted to a rear fork, the position of the axle may sometimes be moved in a lateral direction in order to adjust tension in the drive chain. With such an adjustment, the rear arm together with the axle is also moved relative to the rear fork. A stopper belt may be used to prevent excessive pivotal motion of the rear arm relative to the rear fork. This movement would cause a change in adjustment of the stopper belt, and as a result, a value of definition of the rear sub-cushion to the elongation also changes. Therefore, it is desired that the stopper belt be adjustable as the axle position moves. It is further desired that mounting of an adjuster contributes to better maintenance of the drive device to track the road surface. For solving the aforesaid task, a vehicle according to the present invention may include the axle of the drive wheel supported on the rear end of the rear fork movable in a lateral direction to pivotally connect the front end of the rear arm to the rear end of the rear fork. A rear sub-cushion for damping a pivotal movement of the rear arm and a stopper belt for defining an elongation of the rear sub-cushion may be extended between the rear fork and the rear arm. An adjuster for adjusting the stopper belt may then be mounted on the side of the rear fork. Accordingly, even if the relative position between the rear fork and the rear arm should be changed as the axle moves when the axle is moved in order to adjust tension in the drive chain, the adjuster may be operated whereby the stopper belt may be adjusted to provide constant operation. Therefore, the defined value of the rear sub-cushion to the elongation becomes constant, and the stack resistance is well maintained. Furthermore, since the adjuster may be mounted on the side of the rear fork, the rear arm does not experience an increase in weight. Therefore, the road-surface tracking and the whole drive device is well maintained.

Thus, according to an aspect of the present invention, as the rear end portions of the rear fork are bent inwardly to extend into the inside space defined by the endless belt, and the guide wheels are supported to the rear end portions, the rear arms for supporting the guide wheels as formed independently of the rear fork in the prior art can be eliminated. As a result, a laterally projecting amount of the rear fork projecting from the lateral opposite sides of the endless belt can be reduced since no rear arms are connected on the outside surfaces of the rear fork. Accordingly, the driving device can be made slim to thereby improve the anti-stack performance. Further, as the rear fork is integrally formed with the rear arms to eliminate the latter, the number of parts and the number of assembling steps can be reduced to thereby reduce cost.

According to another aspect of the present invention, a stopper belt is provided with the adjuster for adjusting the effective length thereof. Even when the relative connected position between the rear fork and the rear arm is changed by moving the axle position of the drive wheel when the tension of the drive chain is adjusted, the adjuster can be adjusted to thereby make the effective length of the stopper belt constant. Furthermore, the adjuster of the stopper belt is mounted on the rear fork and therefore, the increase in weight of the rear arm can be prevented despite the provision of the adjuster, and the ability to track the road surface is maintained.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 12 is a view similar to FIG. 10, showing another embodiment of an endless belt;

FIG. 13 is a view similar to FIG. 10, showing yet another embodiment of an endless belt;

FIG. 30 is an enlarged plan view of the essential part of FIG. 29;

FIG. 31 is a side view of the essential part of another form of grip rail according to the present invention;

FIG. 32 is a partial plan view of the rear portion of the endless track device shown in FIG. 31;

FIG. 33 is a cross section along the line F—F in FIG. 32;

FIG. 34 is a side view of the essential part of yet another form of grip rail according to the present invention;

FIG. 35 is a partial plan view of the rear portion of the endless track device shown in FIG. 34;

FIG. 36 is a cross-section along line G—G in FIG. 34;

FIG. 49 is a detail side view taken in the direction of arrow X and oriented to be viewed right-side-up;

FIG. 50 is a side view taken in the direction of arrow Y;

FIG. 51 is a cross-sectional end view taken along line A—A of FIG. 50;

FIG. 52 is a cross-sectional end view taken along line B—B of FIG. 50;

FIG. 53 is a side view taken in the direction of arrow Z of FIG. 48;

FIG. 54 is a cross-sectional end view taken along line C—C of FIG. 53;

FIG. 55 is a cross-sectional end view taken along line D—D of FIG. 53;

FIG. 56 is a partial prospective view of a tread embodiment of a continuous belt; and FIG. 57 is a cross-sectional view of the belt of FIG. 56.

DETAILED DESCRIPTION OF THE PREFERRED EMBODIMENTS

Figure 1:
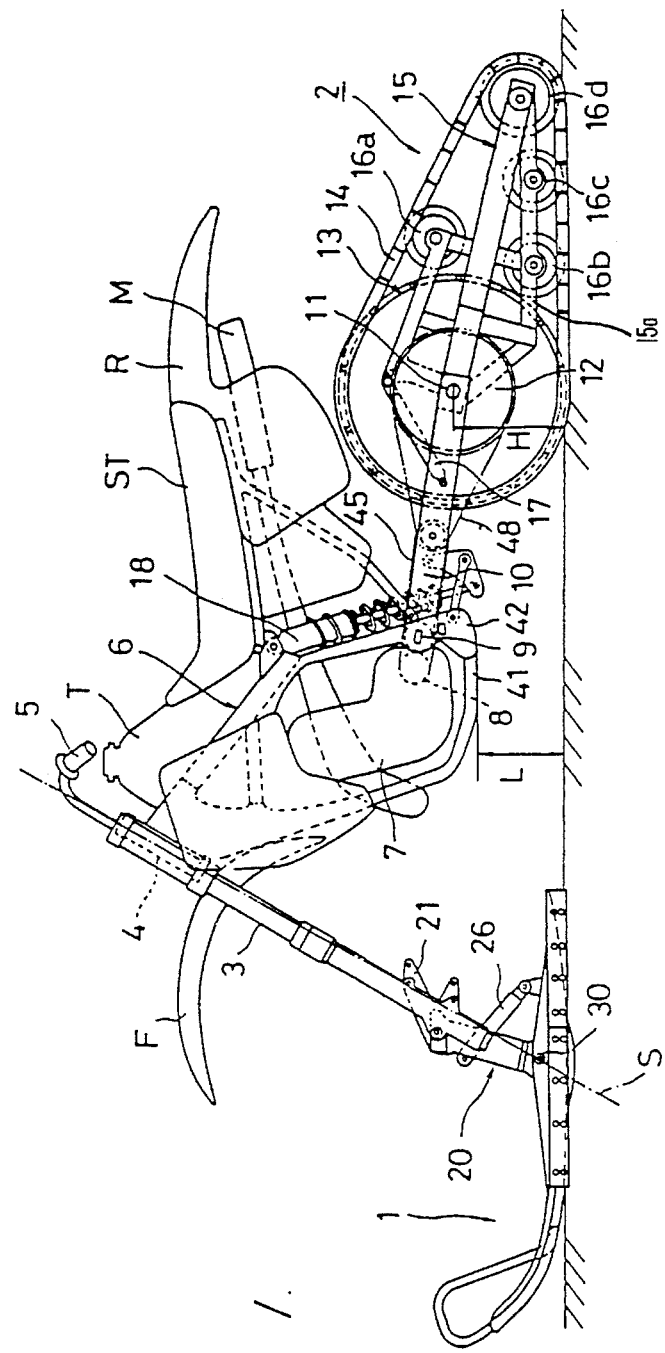
FIG. 1 is essentially a side view of a snow vehicle constructed according to the present invention.
Figure 2:
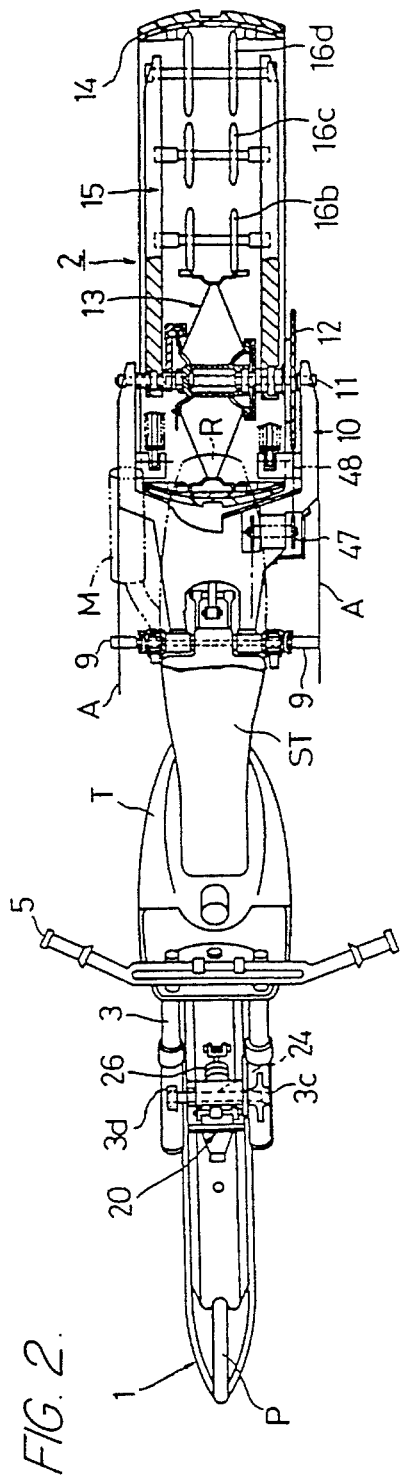
FIG. 2 is a plan view, partly broken away, of the snow vehicle shown in FIG. 1.

Turning to FIG. 1, the snow vehicle apparatus shown in the drawing figures is constructed by utilizing a vehicle body of a motorcycle and substituting a steering ski 1 for the front wheel thereof and an endless track device 2 for the rear wheel. Therefore, many common parts constituting the vehicle body of a motorcycle are used in the snow vehicle. The vehicle body of the snow vehicle includes a front fork 3, a head pipe 4, a handle 5, a vehicle body frame 6, an engine 7, a drive sprocket 8, a pair of right and left footrests 9, a rear fork 10, a rear axle 11, and a driven sprocket 12.

The endless track device 2 includes a driving wheel 13, an endless belt 14, a pair of right and left rear arms 15, a plurality of guide wheels 16a, 16b, 16c and 16d, and a pair of right and left sub-cushions 17.

Figure 4:
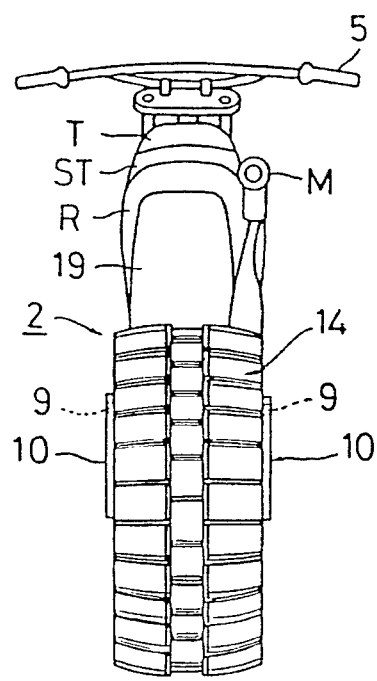
FIG. 4 is a rear elevational view of the snow vehicle shown in FIG. 1.

The vehicle body is provided with a rear cushion 18, an air cleaner case 19 (see FIG. 4), a front fender F, a fuel tank T, a seat ST, a rear fender R, and a muffler M.

Figure 3:
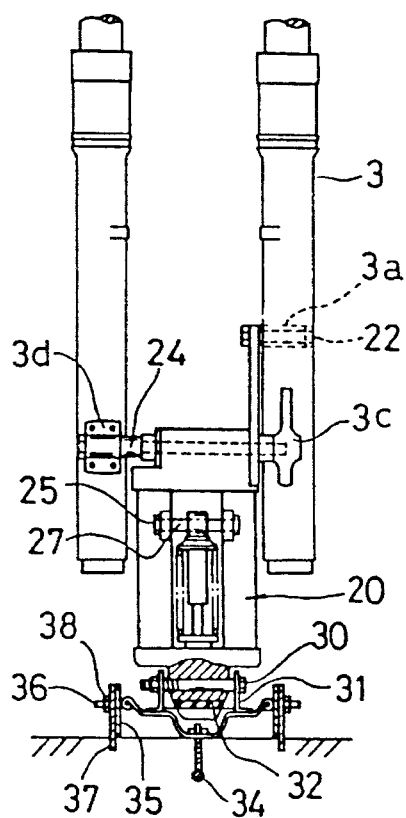
FIG. 3 is a partial front elevational view, partly broken away, of the snow vehicle shown in FIG. 1.
Figure 5:
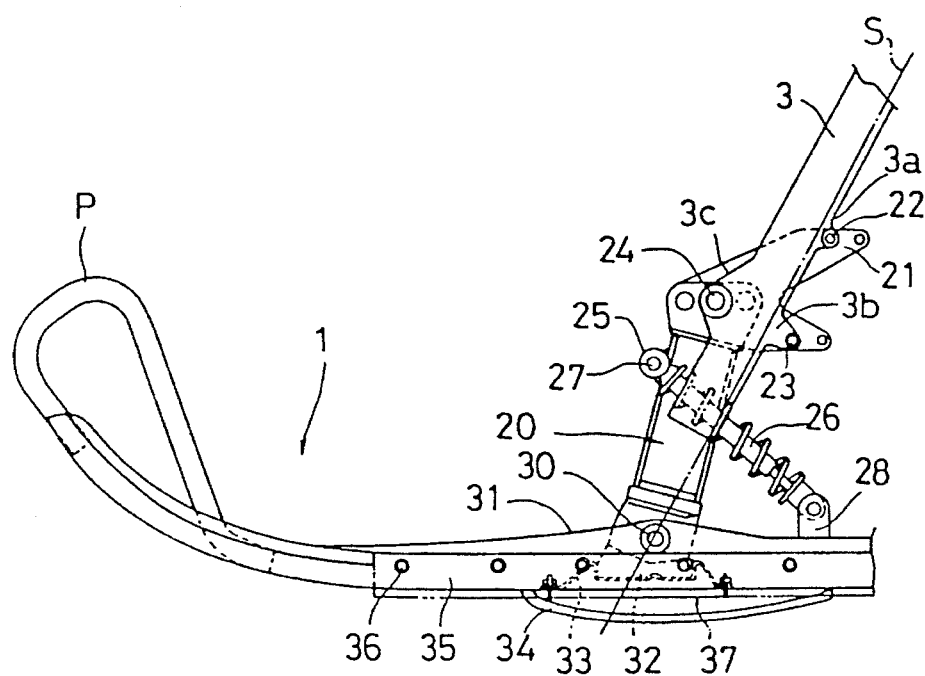
FIG. 5 is an enlarged side view of the steering ski and the mounting structure thereof.
Figure 6A:
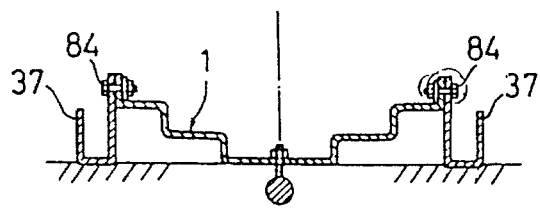
FIG. 6a is a sectional view showing an alternative form of the ski edge member.
Figure 6:
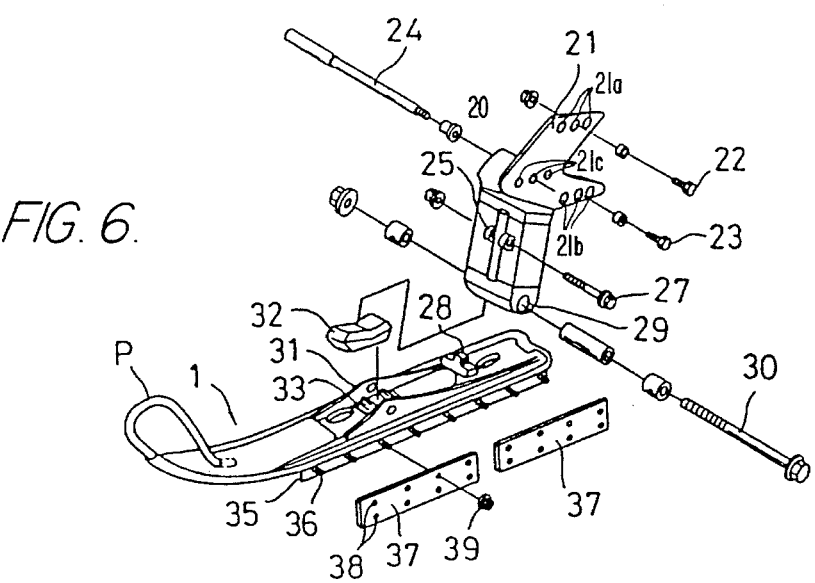
FIG. 6 is an exploded perspective view of the steering ski of FIG. 5.
Figure 8:
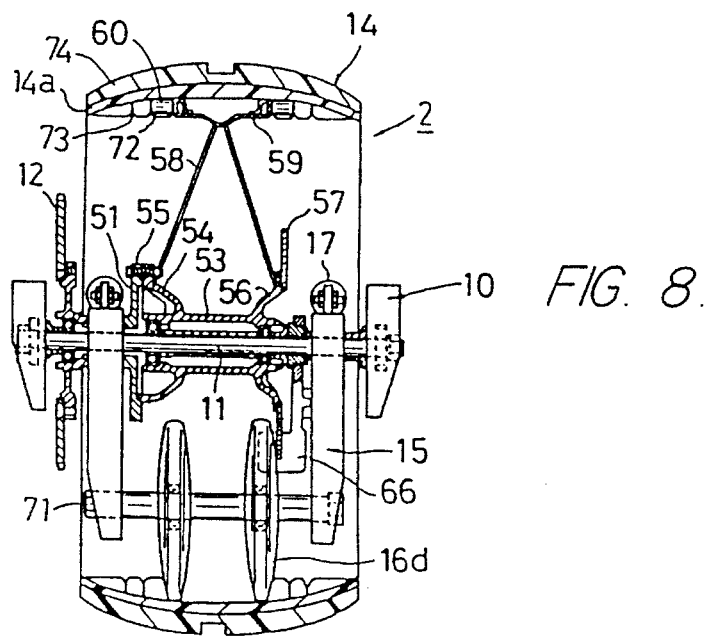
FIG. 8 is a rear elevational view of the endless track device, partly in section.

FIG. 5 is an enlarged side view of the steering ski 1, and FIG. 6 is an exploded perspective view thereof. The steering ski 1 is connected through a ski bracket 20 to a lower end portion of the front fork 3. The ski bracket 20 is formed at its upper end with a wing-like mounting portion 21 having three groups of mounting holes 21a, 21b and 21c, each group consisting of three mounting holes. The front fork 3 is originally formed with a pair of mounting portions 3a and 3b for mounting a brake caliper for motorcycle use and with the supporting portion 3c for the front axle of a motorcycle front wheel. Accordingly, the brake caliper mounting portions 3a and 3b and the front axle supporting portion 3c are utilized as mounting portions for mounting the wing-like mounting portion 21 of the ski bracket 20. Specifically, a pair of bolts 22 and 23 are inserted through two of the mounting holes 21a and 21b, as desirably selected, and are fixed to the mounting portions 3a and 3b of the front fork 3, respectively. Similarly, a shaft 24 is inserted through one of the mounting holes 21c, as desirably selected, and is fixed to the mounting portion 3c of the front fork 3. Thus, the mounting portion 21 of the ski bracket 20 is fixed to the front fork 3 at the three positions. The shaft 24 is supported at its one end to the bracket 3d (see FIG. 3) detachably mounted to one of the arm portions of the front fork 3. Further, the mounting position of the ski bracket 20 to be mounted to the front fork 3 can be adjusted in three-stepwise positions longitudinally of the vehicle body by selecting the respective mounting holes 21a, 21b and 21c.

The ski bracket 20 is formed at its front intermediate position with a mounting portion 25 for mounting one end of a front sub-cushion 26 by means of a bolt 27. The other end of the front sub-cushion is connected to a bracket 28 formed on the steering ski 1. The ski bracket 20 is further formed at its lower end portion with a transverse through-hole 29 for inserting a ski axle 30 therein with collars. The steering ski 1 is formed with a mounting portion 31 for mounting the ski bracket 20 so that the steering ski may be rotated about the ski axle 30.

A lower end surface of the ski bracket 20 is disposed to abut against an elastic member in the form of a rubber buffer 32. The rubber buffer 32 is received in a recess of a housing 33 that is welded to an upper surface of the steering ski 1. A rod-like center runner 34 is mounted on a lower surface of the steering ski 1 at a transversely central position thereof to extend in a longitudinal direction of the steering ski 1.

A pair of right and left elongated edge mounting plates 35 are welded to the opposite sides of the steering ski 1. Each of the mounting plates 35 is formed with a plurality of mounting bolts 36 projecting laterally outwardly. A pair of front and rear plate-like edge members 37 are mounted on each mounting plate 35. Each of the edge members 37 is formed with a plurality of mounting holes 38 arranged in upper and lower lines. The mounting bolts 36 of each mounting plate 35 are inserted through the mounting holes 38 of the edge members 37, and are tightened to a plurality of nuts 39, thus fixedly mounting the edge members 37 to the mounting plates 35. The mounting position of each edge member 37 can be adjusted longitudinally and vertically of the steering ski 1 by selecting the appropriate mounting holes 38. Reference character P designates a protector for preventing the steering ski 1 from piercing the snow. The protector P also serves as a grip for traction of the steering ski 1.

The rear fork 10 is formed at its front end with a pair of pivot portions 10a to be pivotally connected, for example, to a rear portion of the engine 7 by a common shaft 40. The shaft 40 extends through a pair of reinforcing gussets 42 of right and left lower pipes 41 constituting a part of the vehicle body frame 6. The right and left footrests 9 are mounted at the opposite extended ends of the shaft 40 on opposite sides of the vehicle centerline, indicated as C. The amount of lateral projection of the footrests 9 is set such that the free end of each footrest extends to line A (FIG. 7) from each shoulder 10b defining the maximum width of the rear fork 10.

A cushion link 43 is pivotally mounted at its one end to a central portion of a cross member (not shown) provided beneath the shaft 40, and the other end of the cushion link 43 is connected to a cushion bracket 44 pivotally mounted at its one end to a bottom portion of the rear fork 10. The cushion bracket 44 is connected to the lower end of the rear cushion 18 that passes through a recess 10c in the rear fork 10.

The rear fork 10 is provided at its front left position with a first intermediate sprocket 46 to be driven by the drive sprocket 8 through a first chain 45 and with a second intermediate sprocket 47 supported coaxially with the first intermediate sprocket 46 on the outside thereof. The second intermediate sprocket 47 is connected through a second chain 48 to the driven sprocket 12. A flange member 49 mounting the driven sprocket 12 is rotatably mounted on the rear axle 11 which is fixedly supported at its opposite ends to the rear end portions of the right and left arm portions 10d of the rear fork 10. A boss portion 50 of the flange member 49 extends inwardly, and is spline connected to a boss portion 52 of another flange member 51. The flange member 51 is fixedly connected by a plurality of bolts 55 to a left flange portion 54 of a hub 53 of the driving wheel 13, and a brake disc 57 is fixedly connected to a right flange portion 56 of the hub 53. The hub 53 is connected through a plurality of spokes 58 to a rim 59 having a diameter larger than the hub 53 and formed concentrically therewith. A plurality of round pins 60 adapted to drivingly engage the endless belt 14 are provided on the opposite side surfaces of the rim 59 at circumferentially equal intervals in such a manner as to project laterally outwardly. As shown, a shaft portion 61 of each round pin 60 extends into the side of the rim 59 and the round pin 60 is welded thereto.

Front end portions 15a of the right and left rear arms 15 are disposed inside of the right and left arm portions 10d of the rear fork 10, and are rotatably supported through a pair of bearings 62 to the rear axle 11. The driven sprocket 12 is located between the left arm portion 10d and the left rear arm 15. A pair of right and left brackets 63 for mounting the front ends of rear sub-cushions 17 are provided on the inside surfaces of the right and left arm portions 10d. The rear ends of the rear sub-cushions 17 are mounted to the front end portions of the rear arms 15. Either of the rear sub-cushions 17 may optionally be removed.

As shown in FIG. 1, the road clearance H of the rear axle 11 is set to be higher than the minimum road clearance L of the vehicle body under the condition where the driver rides on the vehicle. For braking, a collar 64 is mounted on the rear axle 11, and a caliper bracket 65 for supporting a brake caliper 66 is mounted on the collar 64 in such a manner that the brake caliper 66 may slidingly contact the brake disc 57.

Figure 9:
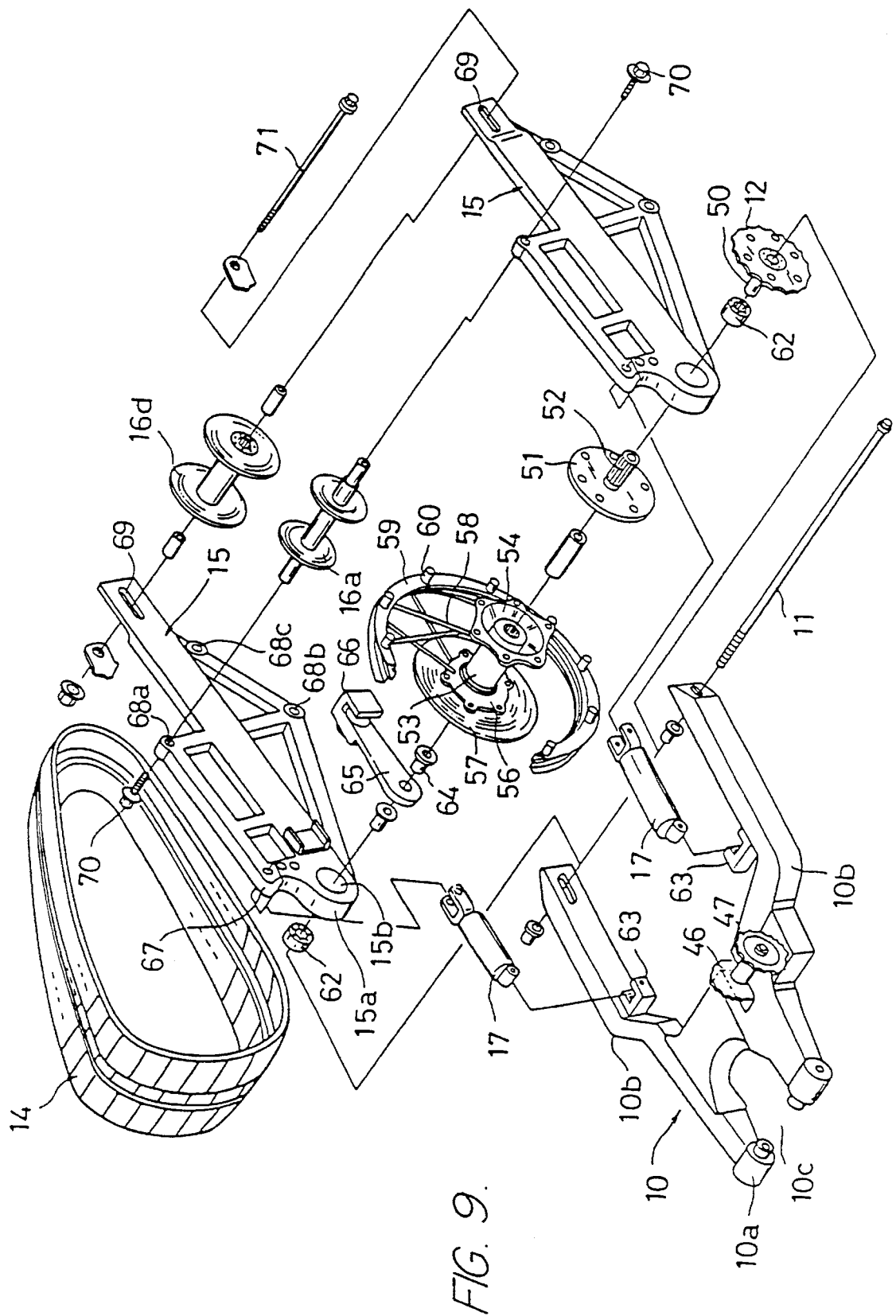
FIG. 9 is an exploded perspective view of the endless track device.

As shown in FIG. 9, both rear arms 15 have the same gridlike construction. The front end portion of the rear arm 15 is formed with a connection hole 15b for receiving the bearing 62. Further, the front upper end portion of the rear arm 15 is formed with a mounting portion 67 for attaching the rear end of the rear sub-cushion 17. The mounting portion 67 has a plurality of mounting holes arranged vertically so that the position of attachment of the rear sub-cushion 17 can be vertically adjusted. Three mounting bosses 68a, 68b and 68c are formed at an intermediate portion of each rear arm 15 for supporting the guide wheels 16a, 16b and 16c, respectively, and a mounting slot 69 is formed at a rear end portion of the rear arm 15 for supporting the rearmost guide wheels 16d. These guide wheels 16a to 16d are designed to idly rotate, and shaft portions thereof are fixed by bolts 70 and 71 to the rear arm 15. While each of the guide wheels 16a to 16d forms a pair of wheels in the preferred embodiment, it should be understood that a single wheel or three or more wheels may alternatively be employed. The axle weight to be loaded on the rear axle 11 is set to be substantially equal to the axle weight to be loaded on the supporting shaft (bolt 71) of the rearwardmost guide wheels 16d. However, a difference in the axle weight between the rear axle 11 and the bolt 71 in the range of about +20% is permitted.

Figure 7:
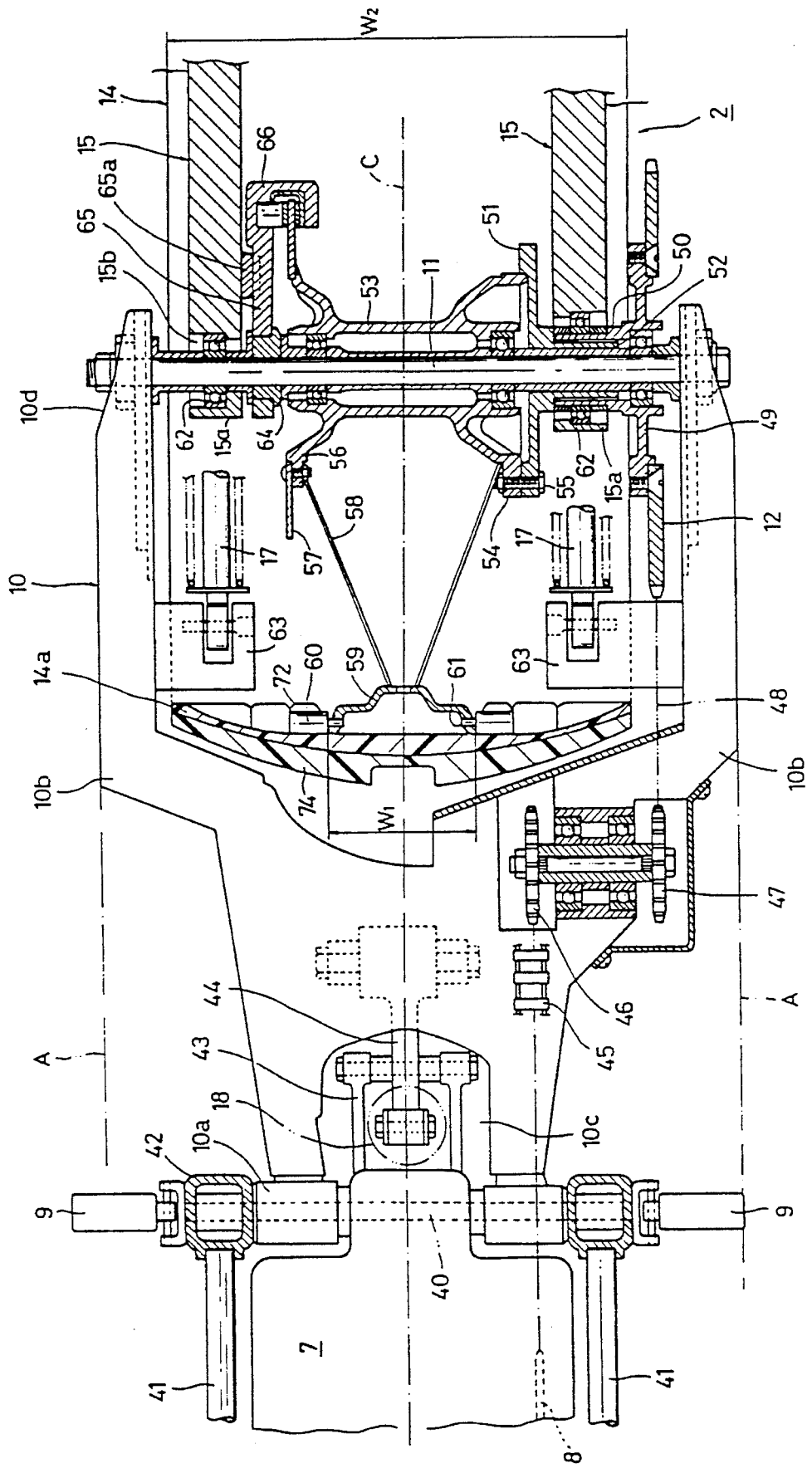
FIG. 7 is an enlarged partial plan view of the rear fork with the front part of the endless track device being shown in section.

As shown in FIG. 7, the endless belt 14 has an extensive width $W_2$, which is set to be slightly smaller than the inner dimension between the right and left arm portions 10d, and the rim 59 has a width $W_1$, which is set to be preferably about 30% to 50% of the width $W_2$ of the endless belt 14. As shown in FIGS. 2, 4, 7 and 8, the endless belt 14 having such a great width can protectively enclose many of the operating elements of the device, including the rear axle 11, the rear arms 15, the guide wheels 16a to 16d, the rear sub-cushions 17, the brake caliper 66, etc.

Figure 10:
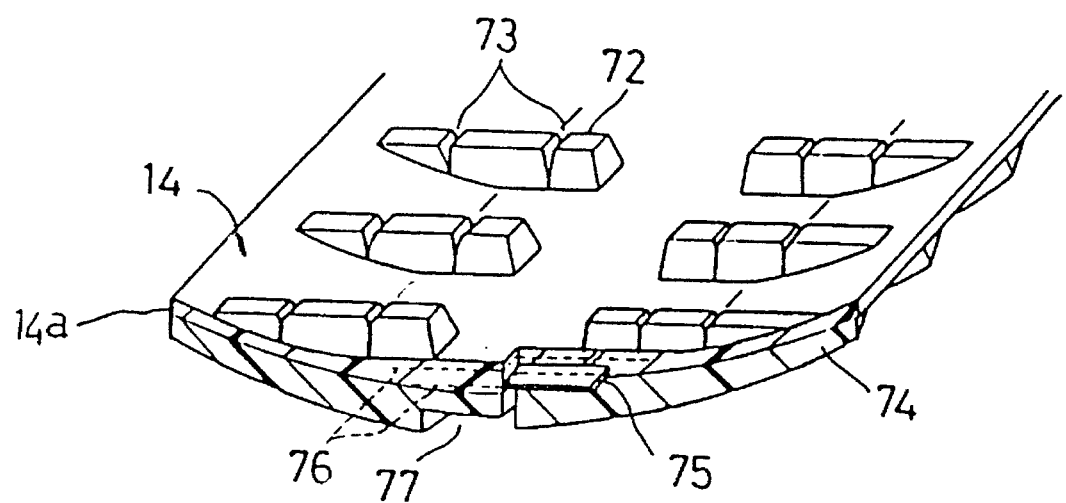
FIGS. 10 and 11 are enlarged perspective views of a part of an endless belt useful in the endless track device, showing inside and outside surfaces thereof, respectively.
Figure 11:
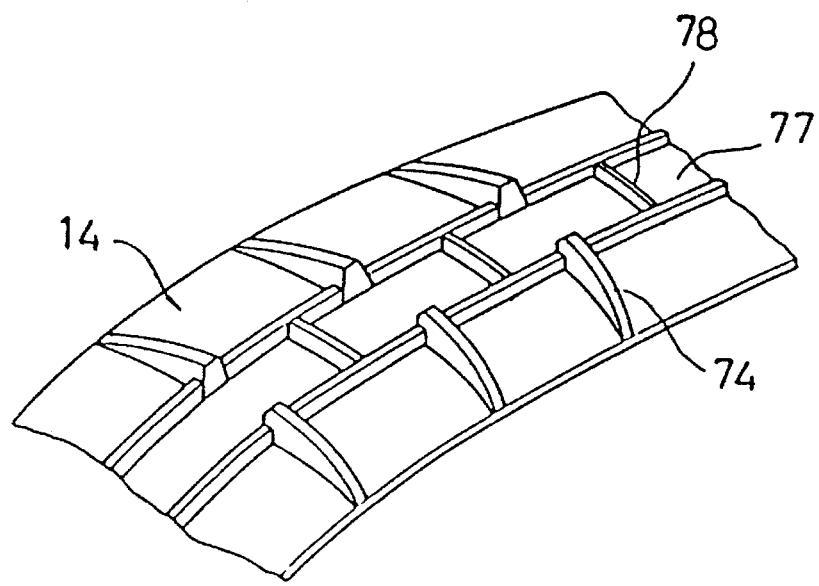

FIGS. 10 and 11 are enlarged perspective views of a part of the endless belt 14, showing inside and outside surfaces thereof, respectively. As shown in FIG. 10, a base 14a of the endless belt 14 is integrally formed on its inner surface with a plurality of cogs 72 defined by projections arranged at circumferentially equal intervals. Each row of cogs 72 extends substantially across the width of the endless belt 14. Each of the round pins 60 fixed to the rim 59 of the driving wheel 13 is adapted to engage the belt between the adjacent rows of the cogs 72. Each cog 72 is preferably formed with a plurality of notches 73 for the purpose of facilitating lateral flexing of the endless belt 14 upon turning of the vehicle thereby to improve the vehicle's turning performance as hereinafter more fully explained.

The base 14a of the belt 14 is integrally formed on its outer surface with a plurality of propelling lugs 74 arranged at circumferentially equal intervals, each row of the lugs 74 extending across the width of the endless belt 14. The base 14a and each lug 74 are formed with an arcuate cross section so as to ensure easy turning of the vehicle.

FIG. 13 is a perspective view of a part of a slightly modified form of endless belt 14', and shows a sectional surface cut across the width thereof. The endless belt 14' is formed of a rubber material, and it is generally comprised of an endless base 14a', a plurality of propelling lugs 74' formed on an outer surface of the endless base 14a', and a plurality of thick-walled portions 72 formed on an inner surface of the endless base 14a'. The propelling lugs 74' are arranged in circumferentially equally spaced relationship from each other. Each lug 74' extends across the width of the endless base 14a', and has an arcuate cross section. A plurality of core members 75 are embedded in the endless base 14a' at positions corresponding to the propelling lugs 74', and a plurality of tension cords 76 are also embedded in the endless base 14a' along the core members 75. In the sectional surface shown in FIG. 13, the right half portion shows a sectional surface cut along a transversely extending center line of one of the propelling lugs 74' (i.e., a line dividing the lug 74' into front and rear parts), while the left half portion shows a sectional surface cut along a line of intersection between the propelling lug 74' and the endless base 14a', with the core member 75 not being cut.

Figure 15:
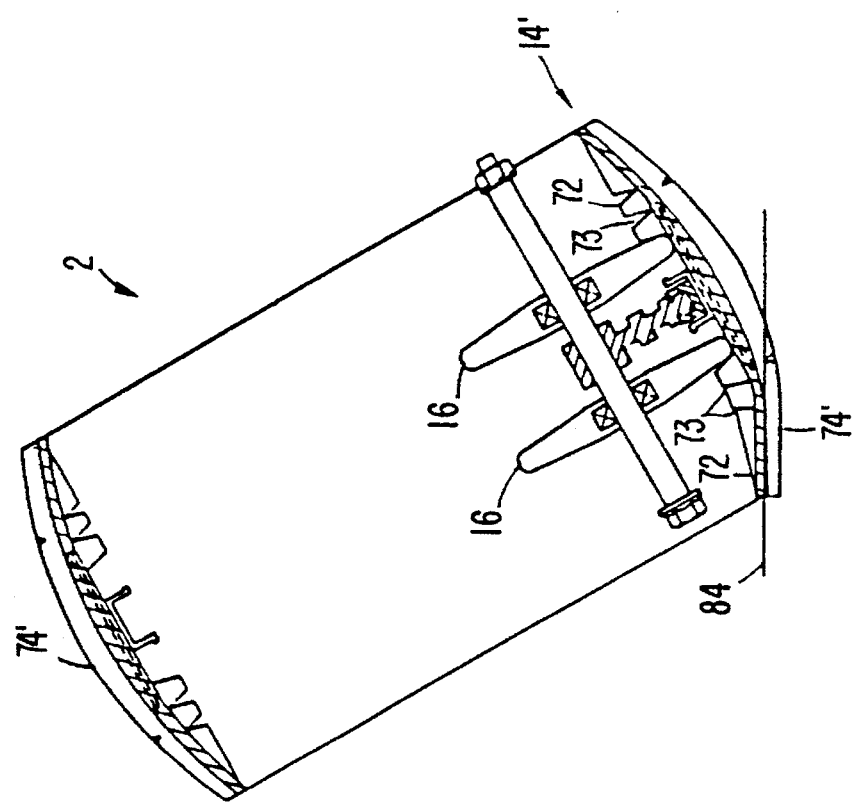
FIG. 15 is a view similar to FIG. 14, showing a leftward inclined condition of the endless track type driving device.

As is apparent from FIG. 13, the core member 75 is embedded at the transversely central portion of the endless base 14a', so as to reinforce the propelling lug 74' at this portion. That is, the core member 75 has a length in the transverse direction of the endless belt 14' smaller than the width thereof, and has a width in the longitudinal or circumferential direction of the belt about equal to the width of the propelling lug 74'. The other portion of the propelling lug 74' not reinforced by the core member 75 is reinforced by the thick-walled portions 72. That is, each thick-walled portion 72 is so located as to correspond to each propelling lug 74', and is composed of a pair of right and left sections extending transversely of the endless base 14a' from positions corresponding to substantially opposite ends of the core member 75 toward the opposite side edges of the endless base. Thus, the propelling lug 74' at its right and left portions not reinforced by the core member 75 is nonetheless given a sufficient stiffness by the right and left sections of the thick-walled portion 72, thereby exhibiting a sufficient propelling force upon turning of the vehicle. Each thick-walled portion 72 is preferably formed with two notches 73 for the purpose of easy deformation of the endless belt 14' upon turning of the vehicle as shown in FIG. 15.

Figure 14:
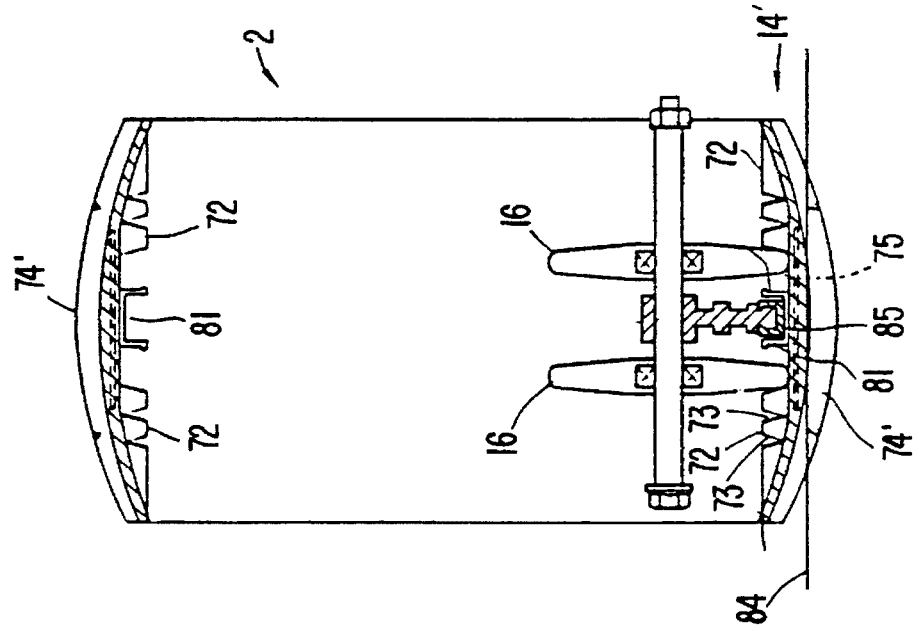
FIG. 14 is a view similar to FIG. 8 illustrating the endless track device provided with a belt guiding apparatus.
Figure 16:
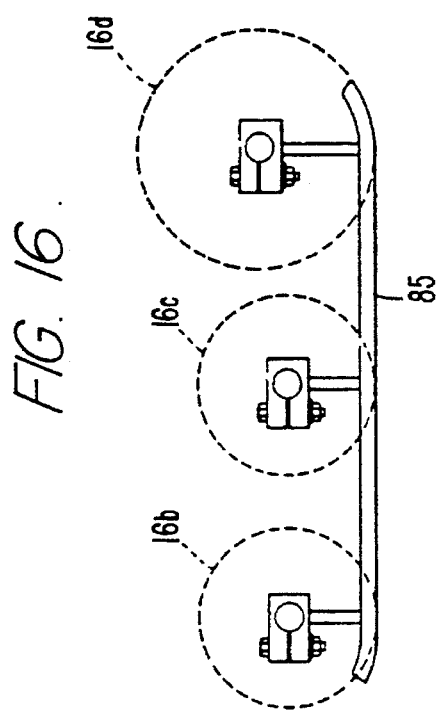
FIG. 16 is an essentially schematic view illustrating the belt guiding apparatus.
Figure 17:
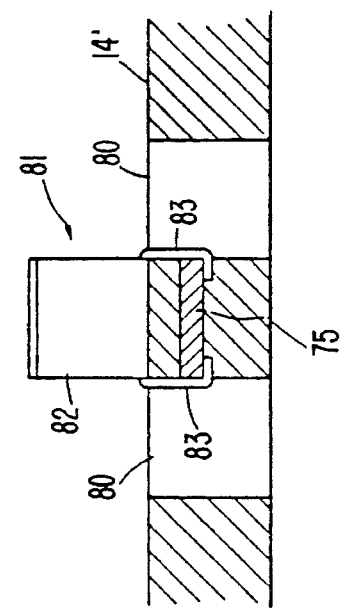
FIG. 17 is a partial sectional elevational view of a part of the endless belt provided with a clip.

Furthermore, the endless belt 14' may, as shown, be formed at its transversely central portion with a plurality of throughholes 80. Each of the through-holes 80 is located between the circumferentially adjacent rows of the thick-walled portions 72. As shown in FIGS. 14 and 17, a clip 81 is fixed to a portion of the endless base 14a' between the adjacent through-holes 80. That is, each clip 81 is comprised of a pair of right and left upward extensions 82 projecting from the inner surface of the endless belt 14' and a pair of front and rear downward extensions 83 projecting into the through-holes 80. The downward extensions 83 extend along the inside surfaces of the through holes 80 in such a manner as to embrace the core member 75, and the free ends of the downward extensions 83 are fixedly inserted into the endless belt 14'.

As shown in FIG. 14, the lower travelling portion of the endless belt 14' is urged from its inner surface by the intermediate wheels 16 and the slide rail 85, so that the outer surface of the endless base 14a' is pressed on the snow surface 84, and the propelling lugs 74' are forced into the snow, thereby providing a propelling force. During travelling of the endless belt 14', the right and left upward extensions 82 of each clip 81 fixed to the endless belt 14' are guided by the slide rail 85 to thereby prevent transverse slippage of the endless belt 14'. Further, although frictional heat is generated due to sliding contact of the endless belt 14' with the slide rail 85 during travelling of the endless belt 14', the heat can be effectively removed by the snow entering the through-holes 80 of the belt. In the case of turning the snow vehicle to the left from the straight travelling condition shown in FIG. 14, for example, the vehicle body is inclined to the left by the rider, as shown in FIG. 15. In this case, as the outer surface of the endless belt 14' is arcuate in cross section, the endless track type driving device 2 readily follows the inclination of the vehicle body as shown in FIG. 15. Particularly, the left portion of the lower travelling portion of the endless belt 14' on the inclined side is readily deformed along two longitudinal lines that connect the notches 79 aligned in the longitudinal direction of the endless belt 14'. Accordingly, the left portion of the lower travelling portion is brought into substantially flat and wide contact with the snow surface 84, thus ensuring a wide contact area. Further, as the propelling lugs 74' at the left portion in this case are reinforced by the thick-walled portions 72, the lugs are forced into the snow to ensure a sufficient propelling force.

In the described embodiment, each of the thick-walled portions 72 is formed with the two notches 73 for the purpose of easy deformation of the endless belt 14' upon turning of the 10 vehicle, and as shown in FIG. 13, each propelling lug 74' is also formed at its right and left portions with two notches 79. Accordingly, the deformation of the endless belt 14' upon turning of the vehicle can be more easily accomplished.

Figure 18:
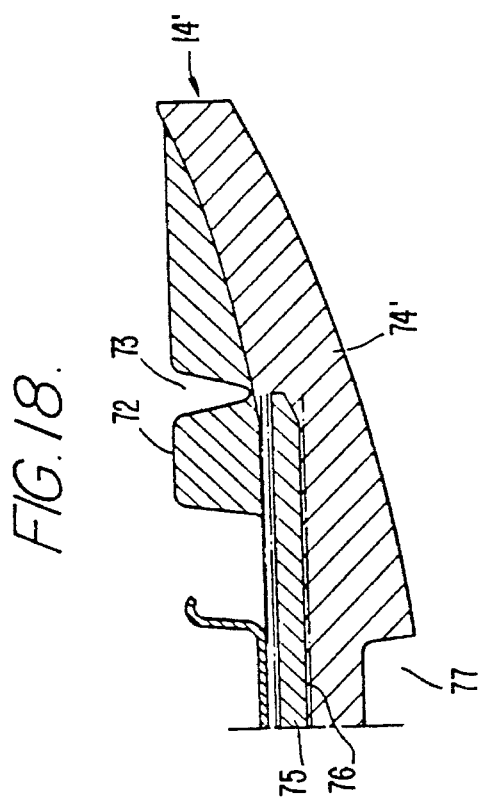
FIG. 18 is a transverse sectional view, shown in half, of another embodiment of the endless belt according to the present invention.

A modification of the sectional shape of the endless belt 14' is shown in FIG. 18. In this arrangement, each thick-walled portion 72 is formed with a single notch 73, and each propelling lug 74' is formed at its transversely central portion with a recess 77 instead of the two notches 79 mentioned above.

Figure 19:
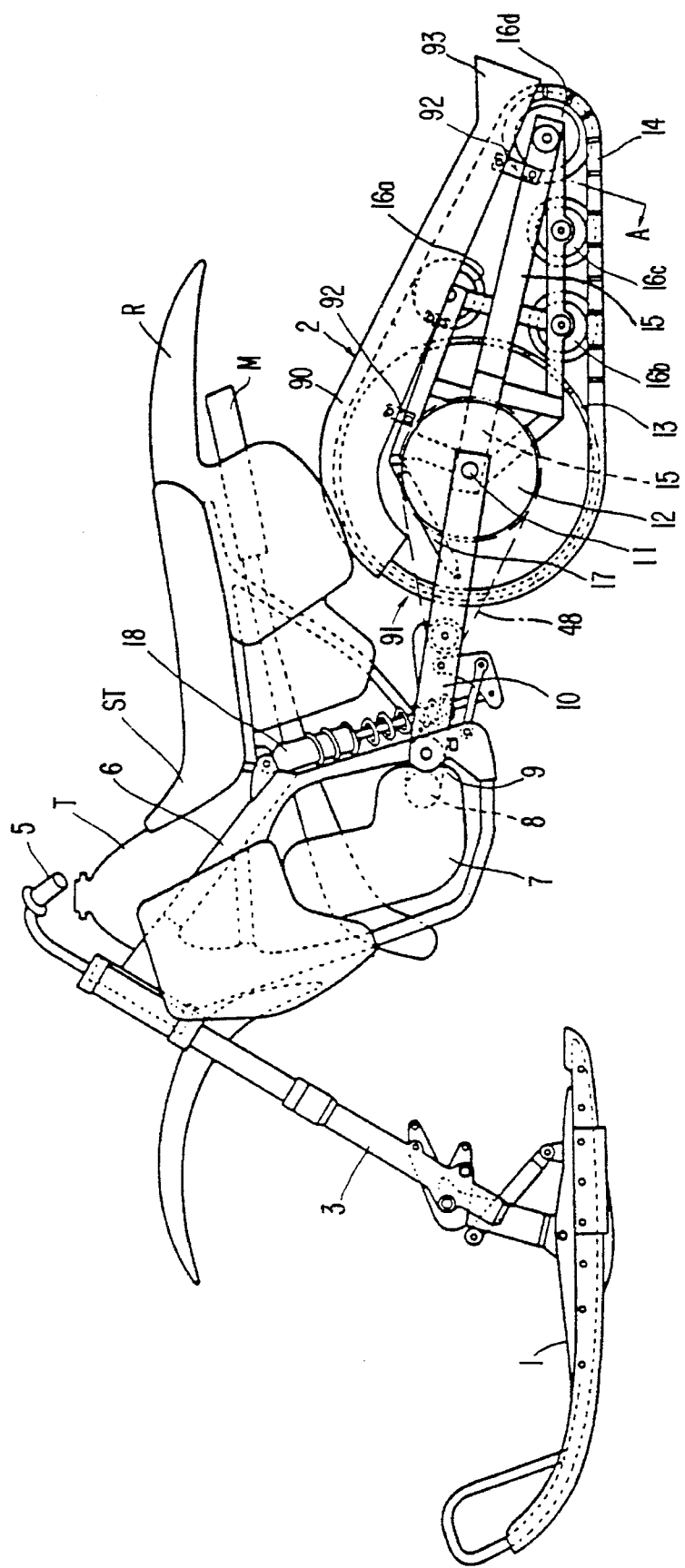
FIG. 19 is a side view similar to FIG. 1 showing an endless track device cover according to the present invention.
Figure 20:
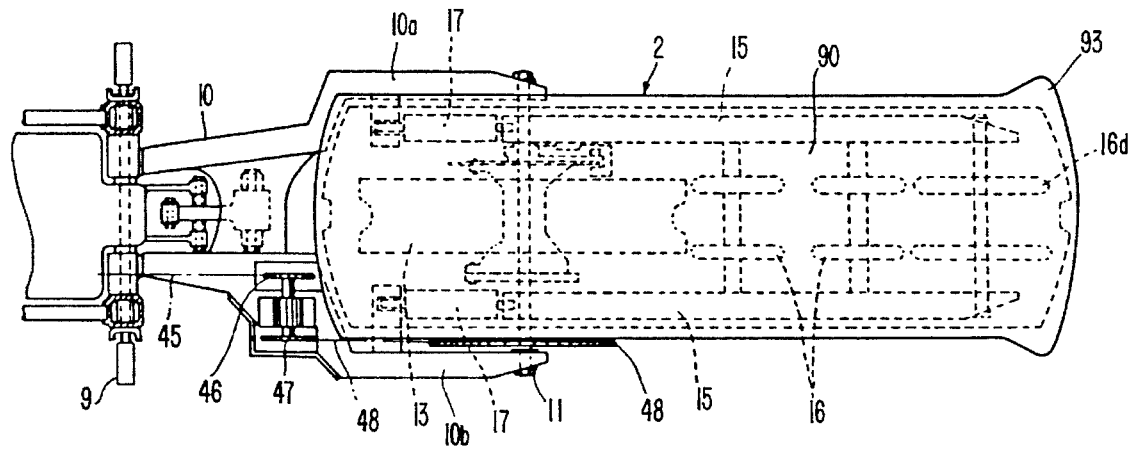
FIG. 20 is an enlarged plan view of the essential part in FIG. 19.
Figure 21:
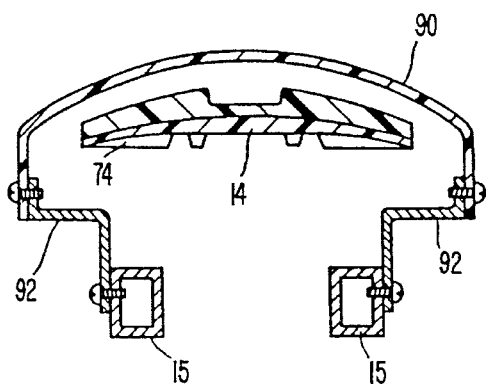
FIG. 21 is a cross section taken along line A—A in FIG. 19.

FIG. 19 is a view similar to FIG. 1 illustrating the endless track cover according to the invention. As shown, the rear fork 10 is pivotally supported at its front end to a pivot frame 8 of the vehicle body frame 6. The track belt cover 90 is provided over the endless track device 2 with a small clearance space 91 being defined between the rear fork 10 and the belt cover 90. The belt cover 90 extends along the upper portion of the track belt 14 and is bent at its opposite side portions to cover the upper and opposite side portions of the track belt. As shown in FIGS. 19 and 21, the belt cover 90 is provided at its opposite side portions with a plurality of mounting stays 92, and is fixedly mounted through the mounting stays to the rear arms 10 and the sub-frames 15. As shown in FIGS. 19 and 20, the rear end portion of the belt cover 90 is formed into an expanded portion 93 projecting upwardly and laterally so that snow, or the like, raised by the track belt 14 at the rearmost guide rollers 16d during running may be hindered from being scattered forwardly.

In operation, the snow raised by the rotation of the track belt 14 during running is prevented from being scattered upwardly and forwardly by the provision of the belt cover 90 above the track belt. Accordingly, the snow raised is prevented from reaching a position near the seat ST and an air intake system such as includes the air cleaner 19. Further, since the belt cover 90 is integrally fixed to the endless track device 2 defined by the rear arms 10 and the upper sub-frames 15, the assembly including the belt cover 90 and the endless track device 2 can be swung about the rear axle 11 with the space between the belt cover 90 and the track belt 14 being maintained constant. Therefore, the effect of preventing the scattering of the snow can be maintained constant at all times. Also, while the rear fork 10, itself, is swingable independently of the endless track device 2, possible interference between the rear fork 10 and the front end of the belt cover 90 can be avoided by the definition of the space 91.

FIGS. 22 to 25 show another embodiment of the cover wherein the same or corresponding parts as in the previous embodiment are designated by the same reference numerals, and the explanation thereof will be omitted hereinafter.

Figure 22:
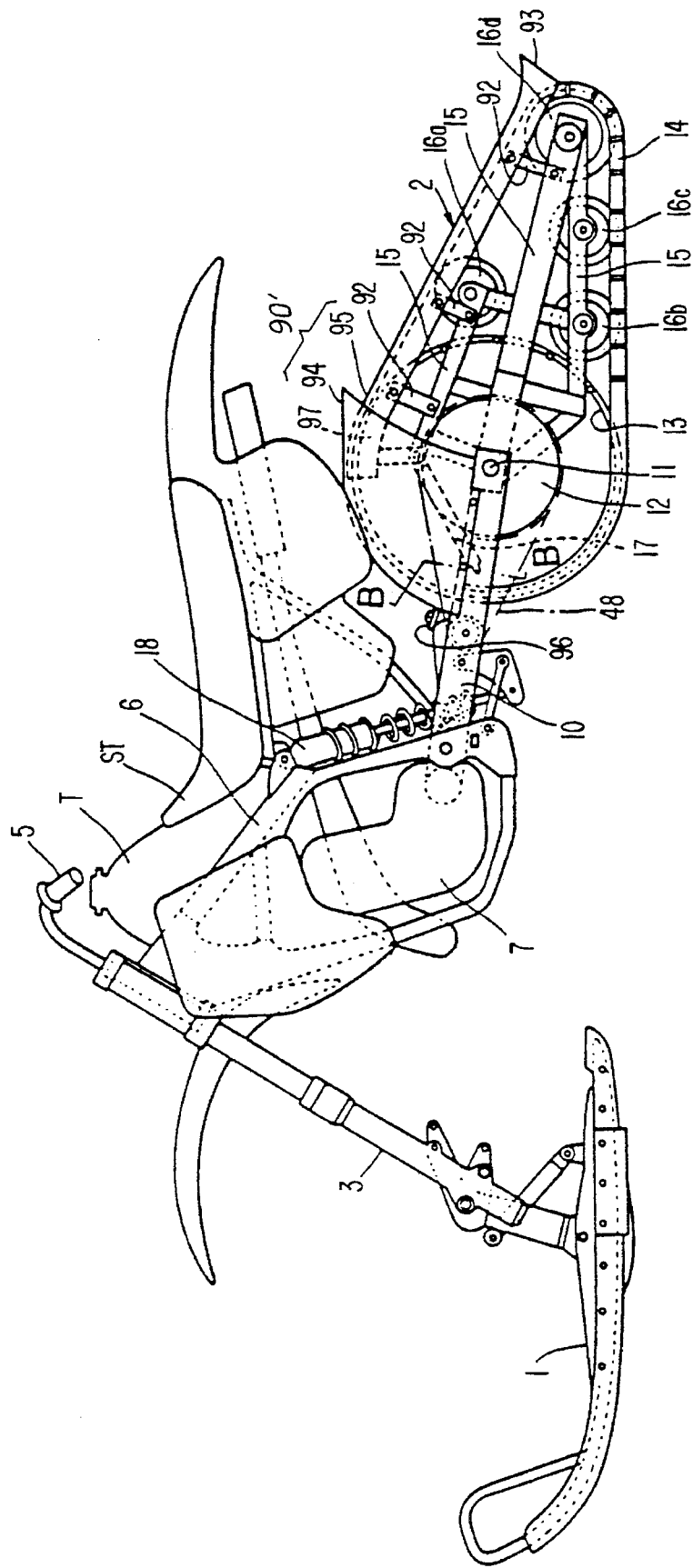
FIG. 22 is a view similar to FIG. 19 showing another form of the endless track device cover according to the present invention.
Figure 23:
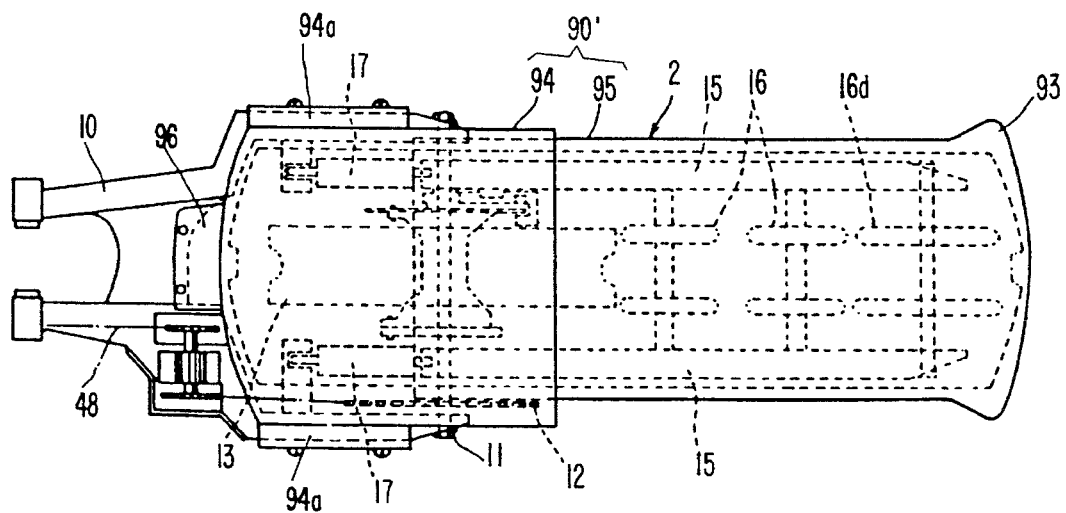
FIG. 23 is an enlarged plan view similar to FIG. 20 of the essential part in FIG. 22.
Figure 24:
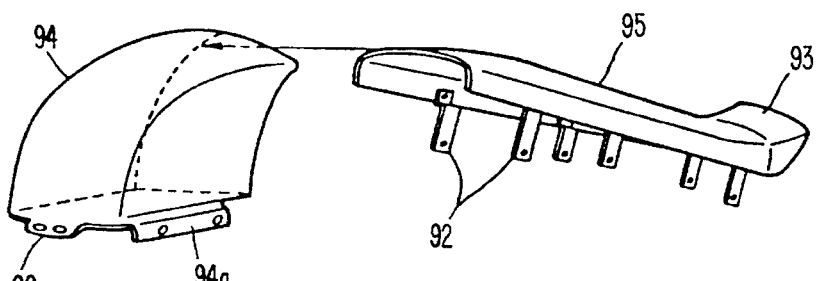
FIG. 24 is an exploded perspective view of the track belt cover shown in FIG. 22.
Figure 25:
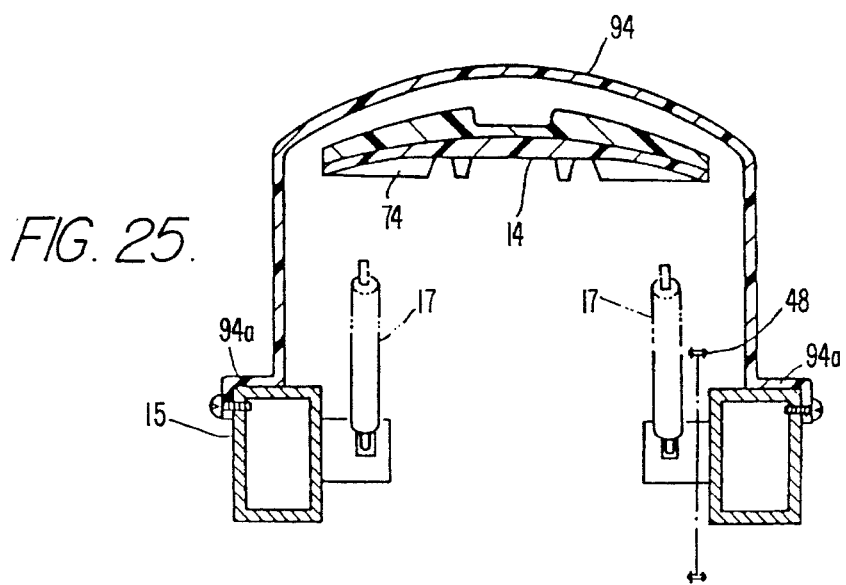
FIG. 25 is a cross section taken along line B—B in FIG. 22.

As is apparent from FIGS. 22 to 24, the belt cover, indicated as 90', is divided into front and rear cover elements 94 and 95. The rear cover element 95 is fixedly mounted to the upper sub-frames 15 in the same manner as the first preferred embodiment, so that the rear cover element may be swung together with the endless track device 2. On the other hand, the front cover element 94 is formed with a front mounting portion 96 to be fixed by screws to the upper surface of the rear fork 10. The front cover 94 is further formed with a pair of right and left side mounting portions 94a to be fixed by screws to the outer side surfaces of the arm portions 10a of the rear fork 10, so that the front cover may be swung together with the rear fork. As shown in FIGS. 22 and 23, a front end portion 97 of the rear cover 95 is laid inside the front cover 94 at a rear end portion thereof to overlap each other.

In operation, when the rear fork 10 and the rear arms 15 are relatively swung during running of the vehicle, the overlapped portions of the rear cover element 95 and the front cover element 94 are relatively moved to suppress the creation of a gap therebetween. Therefore, the upper portion of the track belt 14 is reliably covered with the front cover element 94 and the rear cover element 95, thereby preventing the forward scattering of the raised snow. Furthermore, the space 91 defined between the rear fork 10 and the belt cover 90 in the first preferred embodiment is filled by the front cover element 94 in the second preferred embodiment. Therefore, the possibility of snow scattering through the space 91 toward the rear cushion 9 and the engine 7 can be prevented by the front cover element 94. The front cover element 94 also serves as a chain cover for covering the second chain 48.

Figure 26:
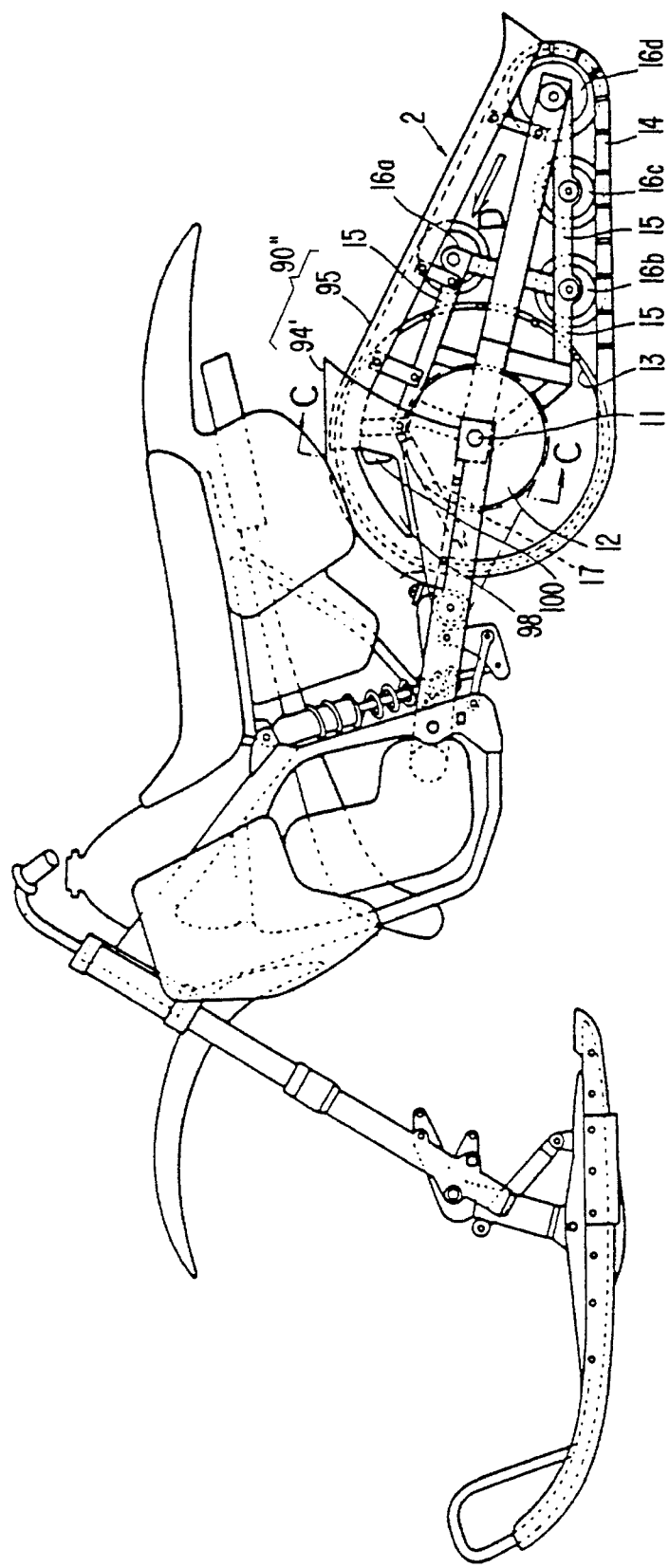
FIG. 26 is a view similar to FIGS. 19 and 22 showing a modified form of endless track cover according to the present invention.
Figure 27:
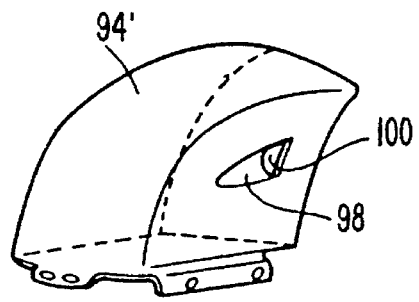
FIG. 27 is a perspective view of the front cover shown in FIG. 26.
Figure 28:
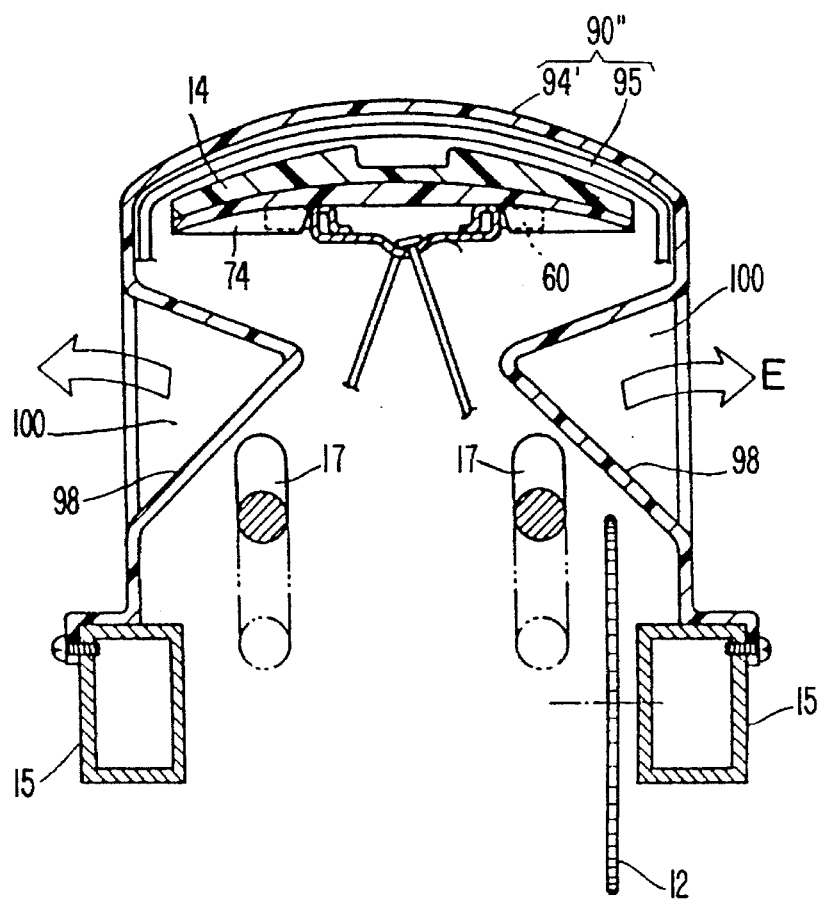
FIG. 28 is a cross section taken along line C—C in FIG. 26.

FIGS. 26, 27 and 28 show another embodiment of the present invention having the same construction as the previously described embodiment, except that the front cover element 94' is formed on its opposite side surfaces with a pair of recesses 98, each having an outlet opening 100 directed toward the front side of the front cover element 94' (see FIG. 27). With this construction, the snow adhering to the inside surface of the track belt 14 and scattering forwardly, as shown by an arrow D in FIG. 26, is discharged from the outlet openings 100 of the recesses 98 as shown by arrows E in FIG. 28. Therefore, it is possible to eliminate the possibility of the snow staying inside the front cover element 94 to generate a running resistance.

Figure 29:
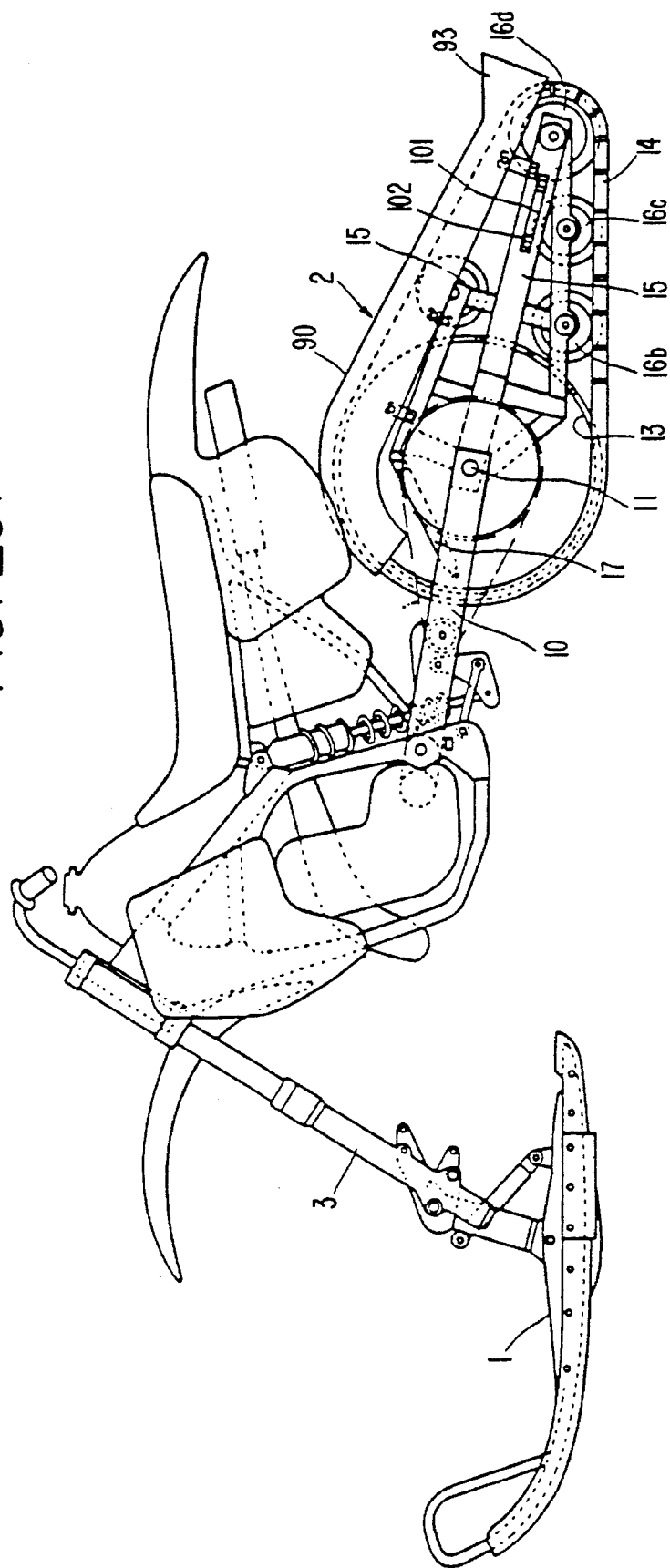
FIG. 29 is a view similar to FIG. 19 showing a covered endless track device having grip rails according to the present invention.

FIGS. 29 and 30 show an embodiment of the present invention having the same construction as the earlier described embodiment except that a pair of grab rails 101 each having a substantially U-shaped configuration, as viewed in plan, are fixed by bolts 102 to the outer side surface of the right and left rear arms 15 at the rear portions thereof. With this construction, when there arises a necessity of lifting the endless track device 2 upon stacking (i.e., contact of the vehicle body with the snow surface that causes idle rotation of the driving wheel) or manual changing of the travelling direction of the vehicle, the endless track device 2 can be easily lifted by gripping the grab rails 101 without being hindered by the belt cover 90.

FIGS. 31, 32 and 33 show a revision of this arrangement wherein a vertically arched grab rail 101' is so provided as to surround the endless track device 90 at the rear end portion thereof. As shown in FIG. 33, the grab rail 101' is formed at its opposite lower ends with a pair of flattened portions 103 to be fixed by bolts 102 to the outer side surfaces of the rear arms 15. The grab rail 101' is located forwardly of the expanded portion 93 of the belt cover 90, and as shown in FIG. 32, the amount of lateral projection of the grab rail 101' is set to be smaller than that of the expanded portion 93, so as to make the vehicle body slim.

FIGS. 34, 35 and 36 show an embodiment of the present invention similar to the previously described embodiment. In this embodiment a pair of sectionally U-shaped brackets 104 are fixed by bolts 102 to the outer side surfaces of the rear arms 15, and the grab rail 101" having a U-shaped configuration is connected to the brackets 104. Each of the brackets 104 is formed at its upper end with a sidewardly projecting portion 105 for connection with the grab rail 101". The grab rail 101" extends rearwardly from the projecting portions 105 of the brackets 104 in substantially parallel relationship to the snow surface. The grab rail 101" is vertically disposed to be lower than the expanded portion 93 of the cover 90, so as not to interfere with the same. As the projecting portions 105 are formed at the upper ends of the brackets 104, a relatively large clearance h of the grab rail 101" from the snow surface can be ensured as shown in FIG. 34. Furthermore, the shaft 71 of the guide rollers 16d can be easily moved longitudinally of the endless track device 2 in the case of adjusting the tension of the track belt 14. Moreover, as the grab rail 101" is located below the expanded portion 93, its width can be made nearly equal to the width of the track belt 14, thereby slimming the vehicle body and improving its ability to pass through narrow spaces. Additionally, the grab rail 101" in this preferred embodiment also serves as a rear bumper.

According to this aspect of the invention, the cover for covering the track belt is located just over the endless track device, and is mounted to the rear arms. Accordingly, the track belt cover can be swung together with the endless track device. While the rear fork and the rear arms are relatively swung during running of the vehicle, the small space between the track belt cover and the track belt is maintained constant at all times, thereby effectively preventing the snow or the like caught up by the track belt from being scattered forwardly.

The track belt cover can be comprised of a front cover component mounted to the rear fork and a rear cover component mounted to the rear arms. Accordingly, even when the rear fork and the rear arms are relatively swung, the upper and front portions of the track belt near the rear fork can be reliably covered with the front cover component. Thus, the area of the track belt to be covered with the cover can be increased to thereby reliably prevent snow, or the like, from being scattered forwardly toward the engine and the associated parts mounted to the vehicle body.

Also, outlet openings can be formed through the opposite side surfaces of the front cover component such that it is possible to prevent the snow, or the like, migrating forwardly along the inside surface of the track belt from staying inside the front cover component where it could create an increase in the apparatus running resistance.

By means of a grab rail mounted to the rear arms, the endless track device can be easily lifted. Therefore, in the case of stacking or changing the travelling direction at a narrow place, for example, the endless track device can be easily handled without being hindered by the track belt cover. Additionally, the grab rail can be utilized as a bumper.

Figure 37:
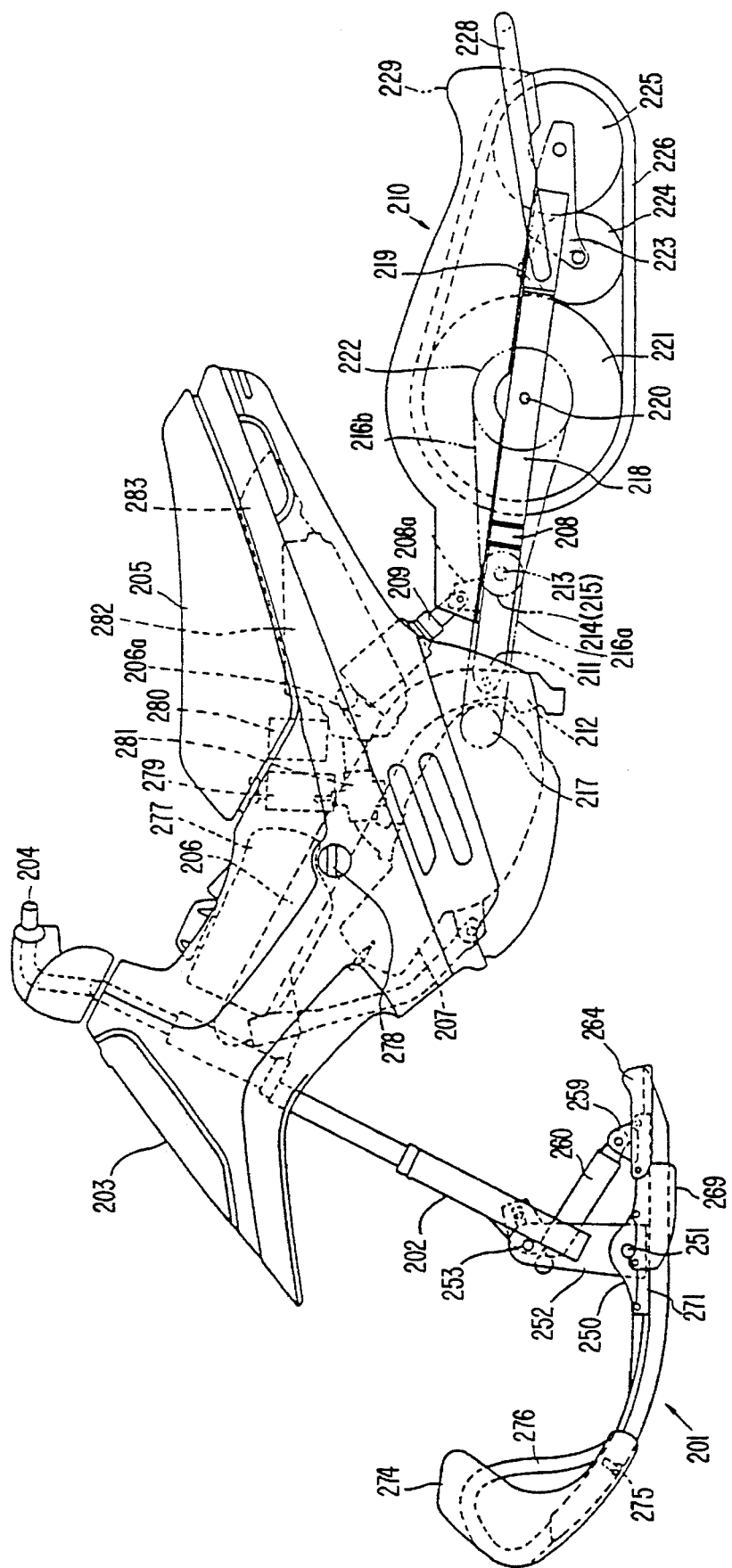
FIG. 37 is a side view of a further embodiment of a snow vehicle constructed according to the present invention.

The snow vehicle of FIG. 37 is primarily constructed of a steering ski 201, a front fork 202, a cover 203 for generally covering a vehicle body, a handle 204, a seat 205, a frame 206, an engine 207, a rear fork 208, a rear cushion 209, a driving device 210, and brackets 206a and 208a provided on the frame 206 and the rear fork 208, respectively, for mounting the rear cushion 209.

Figure 38:
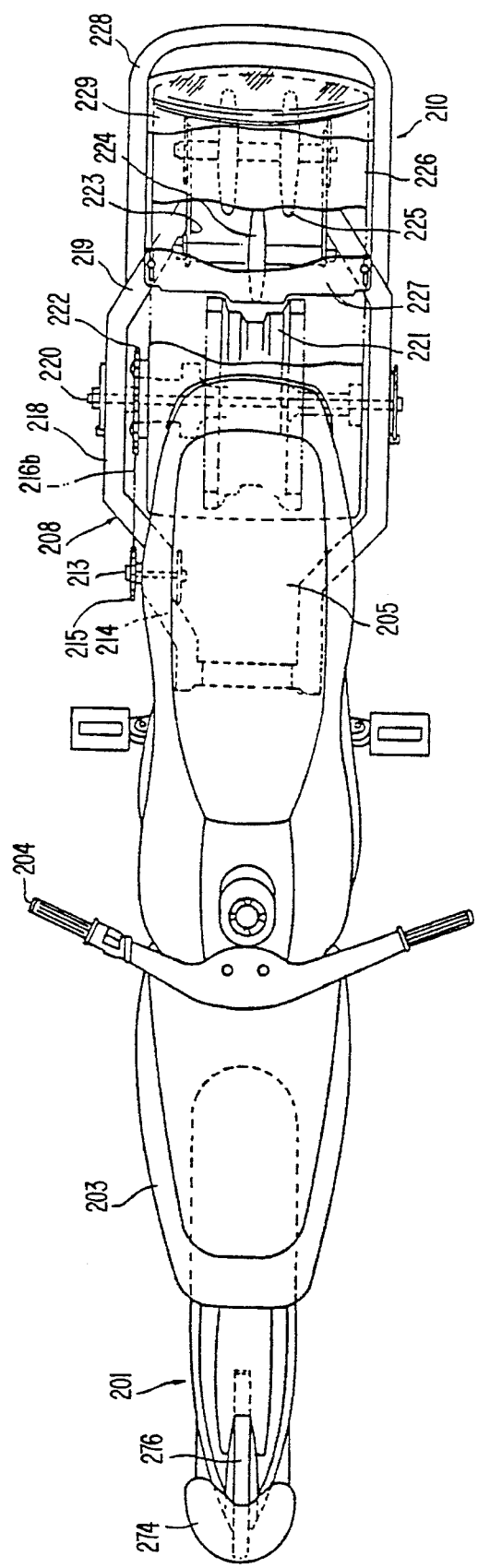
FIG. 38 is a plan view of the snow vehicle shown in FIG. 37.

The rear fork 208 is swingably mounted at its front ends through a pivot 211 to a pair of pivot plates 212 provided at right and left rear lower portions of the frame 206. As shown in FIG. 38, a pair of intermediate sprockets 214 and 215 are coaxially mounted on an intermediate shaft 213 at opposite ends thereof, and the intermediate shaft 213 is supported to an intermediate portion of the rear fork 208. The intermediate sprocket 214 is connected through a first chain 216a to a drive sprocket 217 to be driven by the engine 207. The rear fork 208 is constructed of a pair of right and left laterally expanded portions 218 bent laterally outwardly at a position just behind the intermediate shaft 213 and extending rearwardly in substantially parallel relationship to each other, and a pair of right and left laterally converged portions 219 extending rearwardly continuously from the rear ends of the expanded portions 218 and inclined in such a manner as to be converged toward the lateral center line of the vehicle.

An axle 220 extends laterally between the right and left expanded portions 218 of the rear fork 208, and a drive wheel 221 and a driven sprocket 222 are rotatably supported on the axle 220. A pair of right and left wheel brackets 223 are fixed by welding to the rear ends of the converged portions 219, and a small-diameter guide wheel 224 and a pair of large-diameter guide wheels 225 are rotatably supported through guide wheel shafts 245 and 246, respectively, fixed to the wheel brackets 223. An endless belt 226 is wrapped around the drive wheel 221 and the guide wheels 224 and 225. Thus, the driving device 210 is constructed of the drive wheel 221, the driven sprocket 222, the guide wheels 224 and 225 and the endless belt 226.

As shown in FIG. 38, a laterally elongated scraper plate 227 is fixedly mounted on the upper surfaces of the right and left converged portions 219 at the intermediate portions thereof, and a U-shaped bumper 228 is provided to extend rearwardly from the outer side surfaces of the converged portions 219 at the intermediate positions thereof in such a manner as to be inclined upwardly. The bumper 228 is fixed to the converged portions 219 by welding. However, it may be bolted to the converged portions 219. A cover 229 is provided over the endless belt 226. The endless belt 226 shown in FIG. 37 is illustrated in a cross section showing a laterally central thick-walled portion of the endless belt 226.

Figure 39:
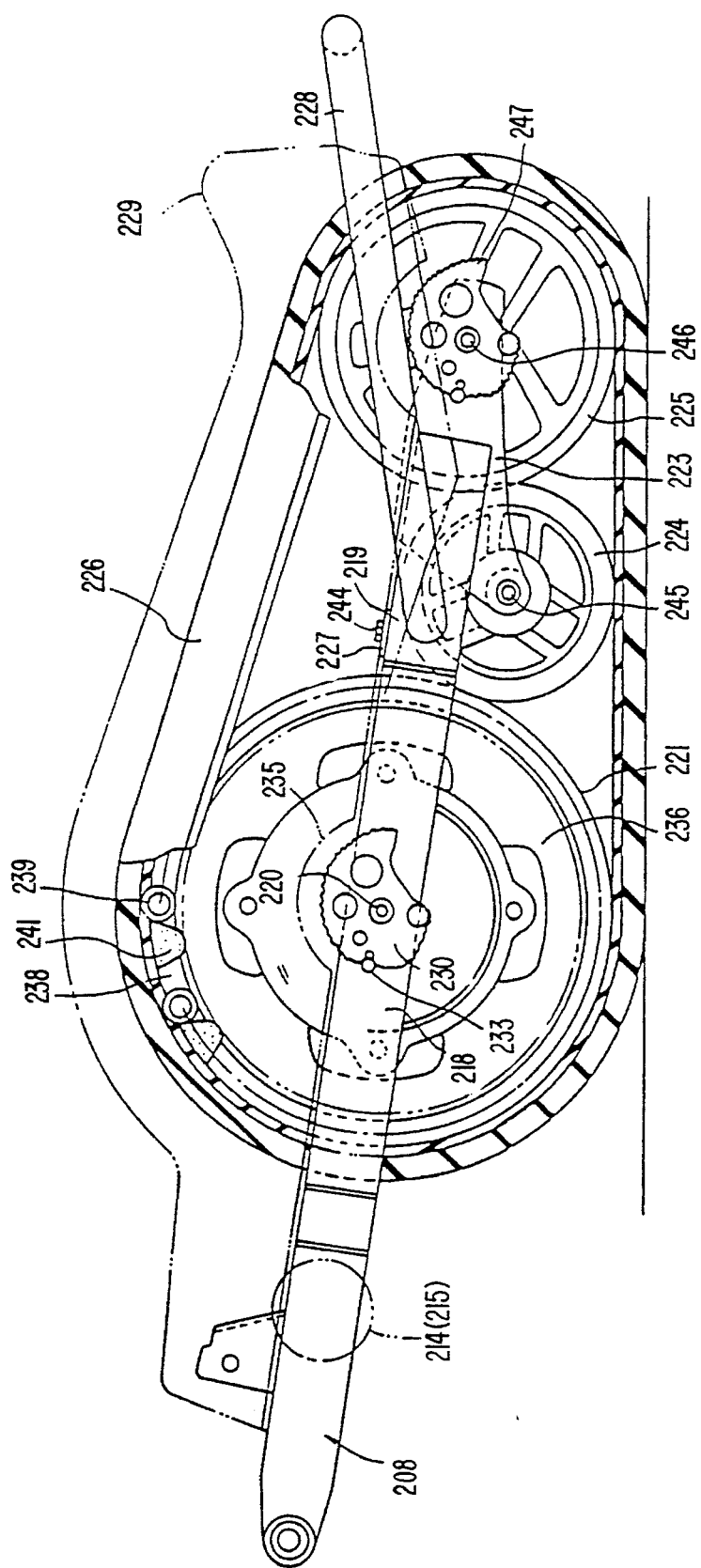
FIG. 39 is a detail side view of the rear swing arm portion of the snow vehicle of FIG. 37.
Figure 40:
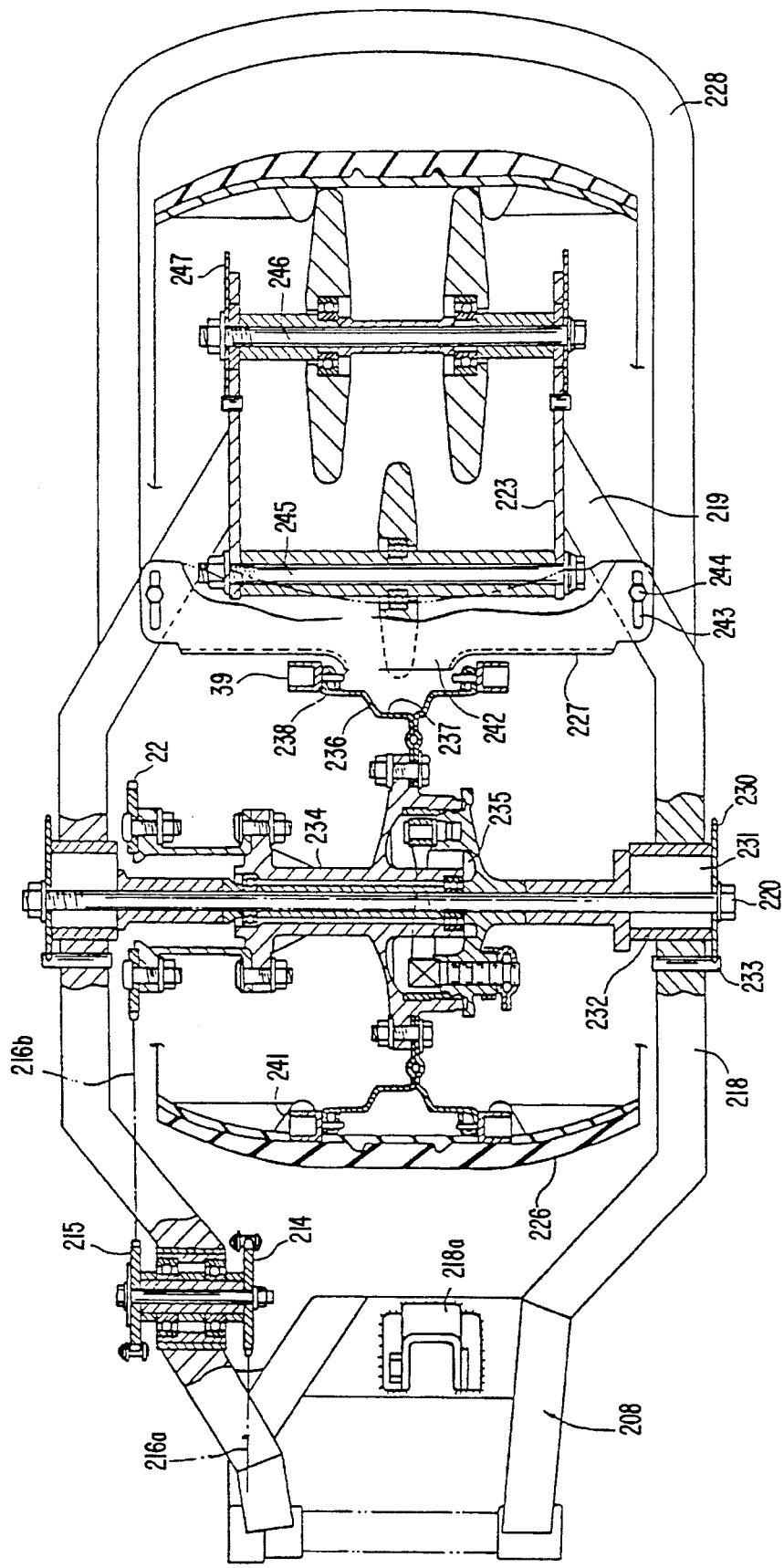
FIG. 40 is a cross-sectional plan view taken through the shafts of FIG. 39.

FIG. 39 is an enlarged vertical sectional view of the driving device 210, and FIG. 40 is a horizontal cross section of FIG. 39, provided that the cover 229 is not shown. The axle 220 is formed as an elongated bolt, and it is supported at its opposite ends to the expanded portions 218 of the rear fork 208 through a pair of right and left chain adjusters. Each of the chain adjusters is constructed of an eccentric plate 230 formed at its outer periphery with a waved groove, a holder 232 supported to the expanded portion 218 and formed with a longitudinally elongated hole 231 through which the axle 220 is inserted, and a stopper rod 233 embedded in the expanded portion 218 and projecting outside to engage the waved groove of the eccentric plate 230.

The driven sprocket 222 is fixedly mounted to one lateral end surface of a hub 234 of the drive wheel 221, and a drum portion 235 incorporating a known drum brake mechanism is provided on the other lateral end surface of the hub 234. A rim 236 of the drive wheel 221 is bolted to an outer circumference of the drum portion 235. The rim 236 is formed at its central outer circumference with an annular recess 237, and the outer circumference of the rim 236 is formed at its laterally opposite edges with a pair of curled portions 238. A plurality of hollow pins 239 each having a leg portion 240 are welded to the outside surfaces of the curled portions 238 in such a manner that the leg portions 240 are inserted into the curled portions 238, thus projecting laterally outwardly from the curled portions 238 of the rim 236. The hollow pins 239 are arranged at given intervals to engage a plurality of laterally elongated lugs 241 formed on an inner surface of the endless belt 226 and arranged at given intervals. The scraper plate 227 is formed at its laterally central portion with a projection 242 projecting into the recess 237 of the rim 236 (see FIG. 40). The scraper plate 227 is formed at its opposite end portions with a pair of longitudinally elongated holes 243 for engaging a pair of bolts 244, so that the scraper plate 227 may be longitudinally adjustably mounted on the upper surfaces of the converged portions 219 at the intermediate positions thereof. As the scraper plate 227 laterally extends between the right and left converged portions 219 of the rear fork 208 as mentioned above, the length of the scraper plate 227 can be made relatively short, resulting in an advantage from the viewpoint of rigidity.

A front portion of the endless belt 226 is accommodated in a space defined inside the right and left expanded portions 218, while the right and left converged portions 219 except the portions connected to the expanded portions 218 as well as the right and left wheel brackets 223 are accommodated in a space defined inside the endless belt 226.

The front and rear guide wheel shafts 245 and 246 are fixedly supported to the right and left wheel brackets 223. The small-diameter guide wheel 224 is rotatably supported on the front guide wheel shaft 245 at a central position thereof, while the large-diameter guide wheels 225 are rotatably supported on the rear guide wheel shaft 246 at spaced positions such that the outer circumference of the rear portion of the guide wheel 224 is interposed between the outer circumferences of the front portions of the guide wheels 225. A pair of chain adjusters having the same positioning structure as that of the chain adjusters for the axle 220 are provided at the opposite ends of the guide wheel shaft 246. Thus, the guide wheel shaft 246 is supported through the chain adjusters to the wheel brackets 223. Each of the chain adjusters for the guide wheel shaft 246 includes an eccentric plate 247 having the same structure as that of the eccentric plate 230 mentioned previously. As apparent from FIG. 39, the cover 229 is formed at its lower edge near the eccentric plates 230 and 247 with a plurality of recesses 235 for permitting rotation of the eccentric plates 230 and 247.

Figure 41:
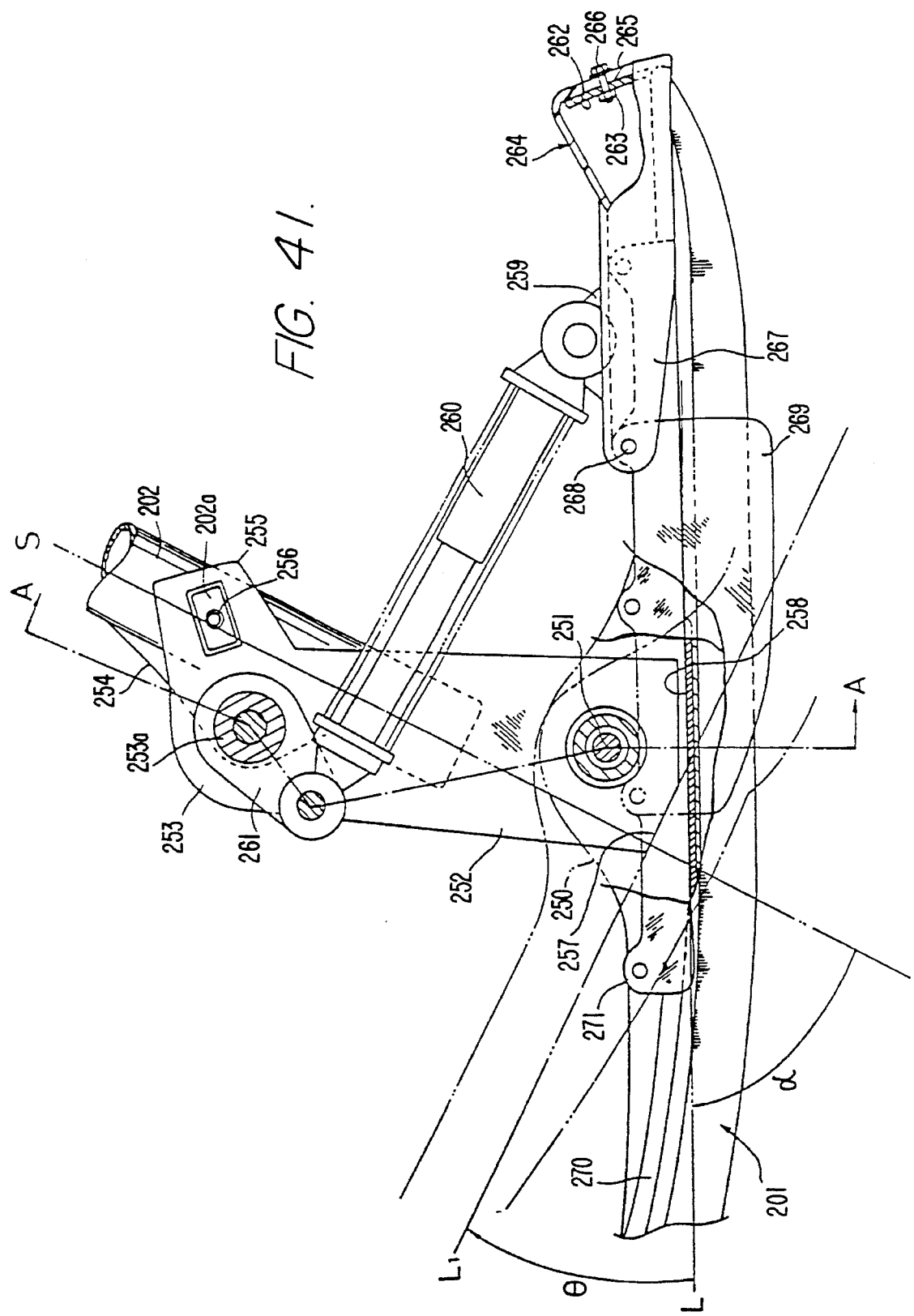
FIG. 41 is a detail side view of the front ski of the snow vehicle of FIG. 37.
Figure 43:
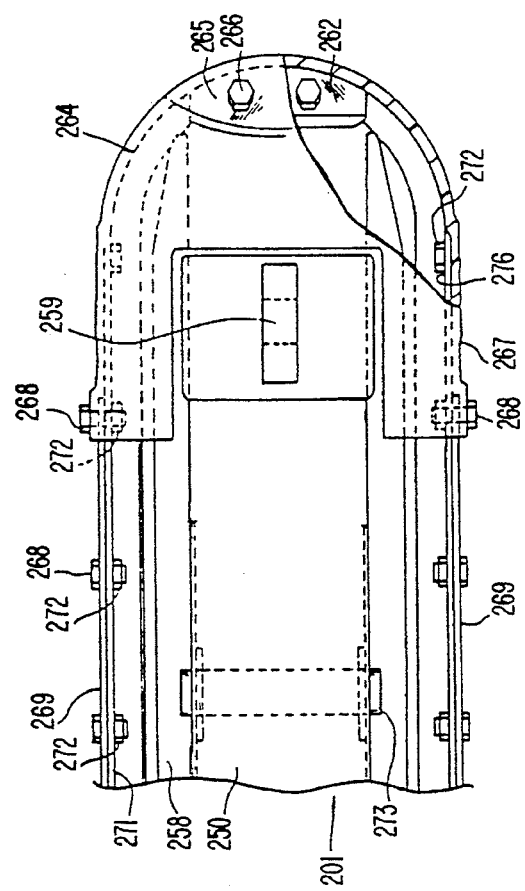
FIG. 43 is a partial plan view of the rear portion of the ski of FIG. 41.
Figure 42:
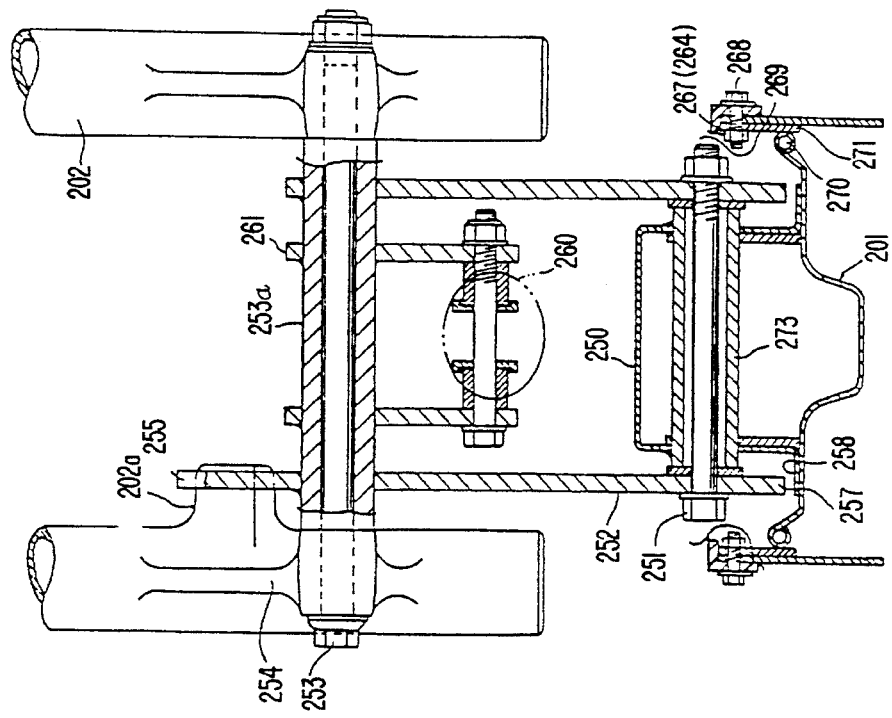
FIG. 42 is a cross-sectional end view taken along line A—A of FIG. 41.

FIGS. 41 to 43 show the steering ski 201 and its associated parts in the preferred embodiment. FIG. 41 is a partially cut-away enlarged side view of a rear half portion of the steering ski 201 and the associated parts, and FIG. 42 is a cross section taken along the line A-A in FIG. 41. An upwardly projecting supporting member 250 having an inverted U-shape as viewed in cross section is provided on a substantially central portion of the steering ski 201, and a pair of right and left ski brackets 252 are rotatably supported at their lower end portions through a pivotal shaft 251 to the supporting member 250. The right and left front forks 202 are formed with a pair of mounting portions 254 projecting forwardly, and a support shaft 253 extends between the mounting portions 254. The ski brackets 252 are welded at their upper end portions to a collar 253a mounted on the support shaft 253. The right one of the ski brackets 252 extends upwardly to form an engaging portion 255 having an engagement hole 256 to be engaged with a boss 202a projecting inwardly from an inner side surface of the right front fork 202. Thus, the ski brackets 252 are positioned, and they are operated integrally with the front forks 202.

The ski brackets 252 are chamfered at their lower front edges to form a pair of inclined corner portions 257. When a swing angle α of the steering ski 201 (i.e., an angle to be defined by a steering axis S and a line L parallel to a general surface of the steering ski 201) is in a given range less than about 90° during a normal running, the corner portions 257 are maintained in spaced relationship from a pair of stopper surfaces 258 formed by bending the lower ends of the supporting member 250 and attaching the same onto the upper surface of the steering ski 201 (see FIG. 42). On the other hand, when the swing angle α exceeds the given range to reach about 90°, for example, as shown by a phantom line in FIG. 41, the corner portions 257 are brought into abutment against the stopper surfaces 258. That is, when the steering ski 201 is swung at an angle Θ to be defined by the movement of the line L to a line $L_1$, resulting that the swing angle α becomes about 90°, further swinging operation of the steering ski 201 is restricted. With this construction, a stopper mechanism for restricting the swinging operation of the steering ski 201 can be simplified.

A stay 259 is formed behind the supporting member 250 to projecting upwardly from the upper surface of the steering ski 201, and a lower end of a front sub cushion 260 is pivotally supported to the stay 259. A pair of cushion brackets 261 are welded at their upper ends to the collar 253a around the support shaft 253, and an upper end of the front sub cushion 260 is pivotally supported to the cushion brackets 261.

A plate 262 is provided at a rear end of the steering ski 201 to project upwardly from the upper surface of the steering ski 201 to be inclined forwardly. A pair of weld nuts 263 are mounted on the plate 262. A rear ski cover 264 is provided to cover the upper surface of the rear end portion of the steering ski 201, and a rear wall 265 of the rear ski cover 264 is inclined forwardly at substantially the same inclined angle as that of the plate 262. The rear wall 265 is mounted on the plate 262, and they are fixed together by engaging a pair of bolts 266 with the weld nuts 263. Opposite side walls 267 of the rear ski cover 264 extend forwardly to the front side of the stay 259, and they are fixed at their front ends by a pair of bolts 268 together with a pair of right and left skid plates 269 to a pair of right and left supporting plates 271 of the steering ski 201. Thus, the rear ski cover 264 is fixed to the steering ski 201 at the four positions.

FIG. 43 is a plan view of the rear portion of the steering ski 201. The rear ski cover 264 is formed in a substantially U-shape as viewed in plan in such a manner as to surround the stay 259. As apparent from FIGS. 42 and 43, the steering ski 201 is formed at its opposite side edges with a pair of curled portions 270, and the right and left supporting plates 271 are welded to the outside surfaces of the curled portions 270 at the intermediate portion thereof. Each of the supporting plates 271 is provided on its inside surface with a plurality of weld nuts 272 arranged at given intervals in the longitudinal direction. The skid plates 269 are mounted to the supporting plates 271 by selectively engaging a plurality of bolts 268 with the weld nuts 272 in such a manner that a mounting position of the skid plates 269 may be adjusted in the longitudinal direction. Reference numeral 273 denotes a collar mounted around the pivot shaft 251 and welded to the supporting member 250.

As shown in FIGS. 37 and 38, a front ski cover 274 is mounted to a front end portion of the steering ski 201. The front ski cover 274 is fixed by a pair of bolts 275 to a bottom surface of the steering ski 201 in such a manner as to surround the front end portion of the steering ski 201. A looped reinforcing pipe 276 is provided at a laterally central position of the front end portion of the steering ski 201 to project upwardly, and the front and side portions of the reinforcing pipe 276 are covered with the front ski cover 274. The front ski cover 274 extends upwardly more than the reinforcing pipe 276.

Referring to FIG. 37, the snow vehicle is provided with a fuel tank 277, a fuel tank cock 278, an oil tank 279, a battery 280, a carburetor 281, an air cleaner 282 and a muffler 283. These parts are entirely covered with the cover 203.

In operation, an output from the engine 207 is transmitted through the drive sprocket 217, the first chain 216a, the intermediate sprocket 214, the intermediate shaft 213, the intermediate sprocket 215, the second chain 216b and the driven sprocket 222 to the drive wheel 221. Thus, the drive wheel 221 is rotated, and the pins 239 of the rim 236 are brought into engagement between the adjacent lateral lugs 241 of the endless belt 226, thereby rotating the endless belt 226 around the drive wheel 221 and the guide wheels 224 and 225. Thus, the vehicle is driven to advance. The guide wheels 224 and 225 are supported to the converged portions 219 continuously extending rearwardly from the expanded portions 218 of the rear fork 208 and accommodated in the inside space of the endless belt 226. That is, it is unnecessary to prepare right and left arms for supporting the guide wheels 224 and 225 independently of the rear fork 208 and connect the rear arms to the laterally outside surfaces of the rear end portions of the rear fork 208 as in the prior art. Accordingly, a laterally projecting amount of the rear fork 208 projecting from the lateral opposite sides of the endless belt 226 can be made minimum and greatly reduced as compared with the prior art. Therefore, the driving device is made slim to thereby improve the anti-stack performance. Furthermore, as the converged portions 219 for supporting the guide wheels 224 and 225 are formed integrally with the rear fork 208 without the rear arms of the prior art, the number of parts and the number of assembling steps may be reduced to thereby reduce a cost. Alternatively, the converged portions 219 may be formed independently of the expanded portions 218 of the rear fork 208, and may be bolted to the rear portions of the expanded portions 218. However, a complicated connecting structure between the rear fork 208 and the rear arms in the prior art is not necessary. That is, various parts inclusive of collars for damping or restricting relative swinging motion between the rear fork and the rear arms can be omitted to thereby simplify the connecting structure and reduce the number of parts and the number of assembling steps. Further, as the bumper 228 is mounted to the converged portions 219, it also serves as a reinforcing member for the converged portions 219.

As the carburetor 281 and the air cleaner 282 are covered with the cover 203, an outside air flowing, inside the cover 203 is warmed up to near an ordinary temperature by the engine 207 and the muffler 283, thereby suppressing icing of the carburetor 281.

Figure 44:
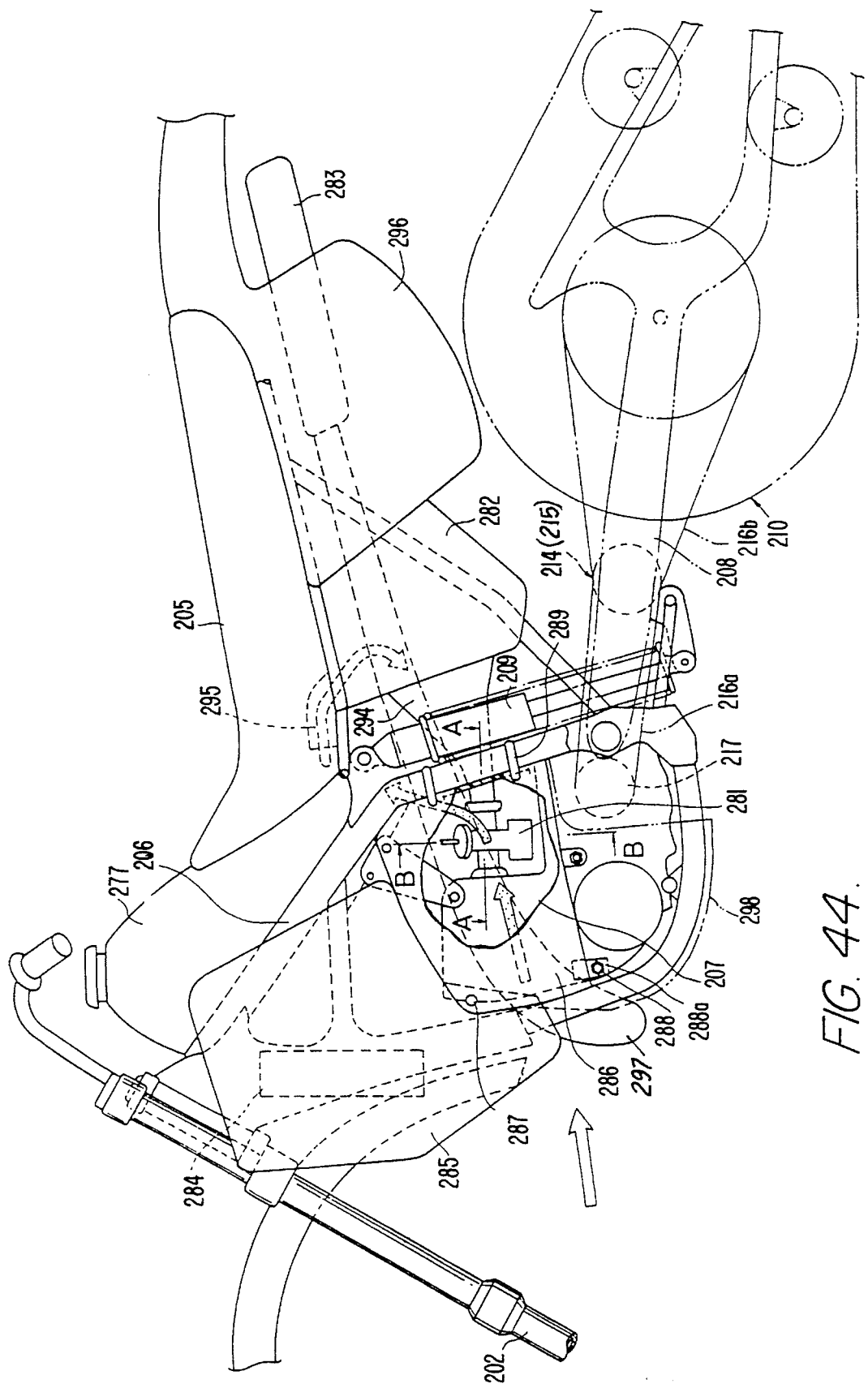
FIG. 44 is a partial side view of a further embodiment of the present invention.
Figure 45:
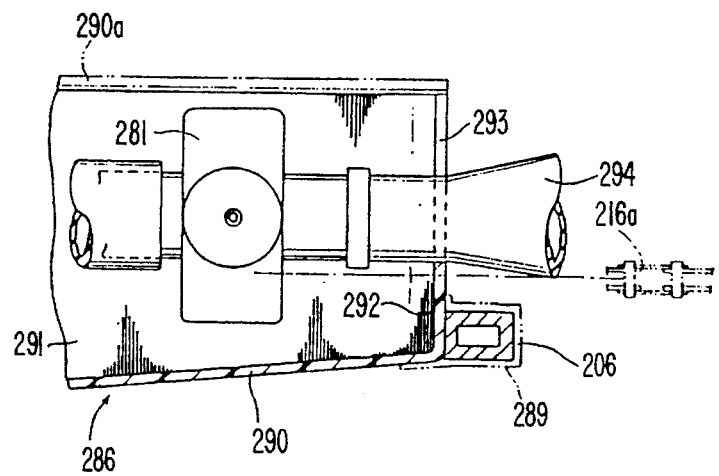
FIG. 45 is a cross-sectional plan view taken along line A—A of FIG. 44.
Figure 46:
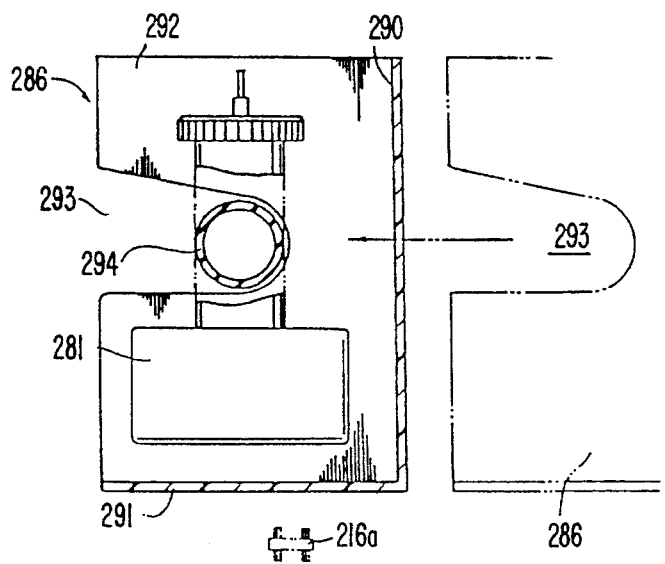
FIG. 46 is a cross-sectional end view taken along line B—B of FIG. 44.

FIGS. 44 to 46 show another preferred embodiment of the vehicle body of the snow vehicle for the purpose of preventing the icing of the carburetor. FIG. 44 is a side view of a central portion of the vehicle body of the snow vehicle mounting a water-cooled engine 207. A radiator 284 is provided before the frame 206, and a pair of right and left radiator shrouds 285 are provided on the right and left sides of the radiator 284. Upper portions of the radiator shrouds 285 are located to contact the opposite side surfaces of the fuel tank 277, and lower portions of the radiator shrouds 285 are connected to right and left side covers 286. The side covers 286 are so provided as to cover the outer periphery of the carburetor 281. That is, an upper front portion of each side cover 286 is mounted to overlap the radiator shroud 285, and is connected together by a screw 287. A lower portion of the side cover 286 is fixed through stays 288 by bolts 288a to the side surface of a case of the engine 207. A rear portion of the side cover 286 is fixed to the frame 206 by a pair of bands 289 such as rubber bands. Thus, the side cover 286 is detachably mounted to the vehicle body, so as to permit easy maintenance of the carburetor 281.

FIG. 45 is an enlarged sectional view of the left side cover 286 taken along the line A—A in FIG. 44, and FIG. 46 is an enlarged sectional view of the left side cover 286 taken along the line B—B in FIG. 44. As apparent from FIGS. 45 and 46, the side cover 286 is constructed of an outer side wall 290, a bottom wall 291 and a rear wall 292, thus surrounding the three sides of the carburetor 281. Although he side cover 286 is open on the inner side thereof, an inner side wall 290a substantially parallel to the outer side wall 290 may be provided as shown in FIG. 45 to cover the inner side of the side cover 286. As apparent from FIG. 45, the bands 289 provided on the rear wall 292 are wound around the frame 206.

The bottom wall 291 also serves as a partition wall for partitioning the carburetor 281 from the first chain 216a located under the carburetor 281. As apparent from FIG. 46, the rear wall 292 is formed with a recess 293 cut from he inner side of the side cover 286, and a connector hose 294 for connecting the carburetor 281 with the air cleaner 282 is inserted in the recess 293. That is, the left side cover 286 can be mounted from the left side of the engine 207 in such a manner that the recess 293 comes into engagement with the connector hose 294 as shown in FIG. 46. However, in the case that the inner side wall 290a (see FIG. 45) is provided, it is a matter of course that the left side cover 286 cannot be mounted from the left side of the engine 207.

Referring back to FIG. 44, an air duct 295 opening to the front side is provided above the air cleaner 282 and near the bottom of the seat 205. A rear cover 296 covering the rear and side portions of the vehicle body is provided behind the air cleaner 282, and the muffler 283 located on the right side of the vehicle body is covered with the rear cover 296.

The right side cover 286 not shown is provided on the right side of the vehicle body in symmetrical relationship with the left side cover 286. The right side cover 286 is so located as to cover the right side of the carburetor 281 and an exhaust pipe 297 extending from the engine 207 through the right side of the vehicle body to the muffler 283. A lower cover 298 may be provided below each side cover 286 to cover each side of the engine 207. Each side cover 286 may be formed integrally with both the radiator shroud 285 and the lower cover 298 on the same side, or may be formed integrally with the lower cover 298 on the same side. The other construction is substantially the same as the construction shown in FIG. 37, and the same or corresponding parts as those in FIG. 37 are designated by the same reference numerals in FIG. 44.

According to the above-mentioned construction shown in

FIG. 44, the icing of the carburetor 281 can be presented without entirely covering the vehicle body by the cover 203 as in FIG. 37. In operation, a cold outside air flows into the inside area defined between the right and left side covers 286, and it is warmed up to near an ordinary temperature by the engine 207 and the exhaust pipe 297. Then, the warmed air is allowed to pass aside the carburetor 281, and is then induced from the air duct 295 into the air cleaner 282. Further, snow scattered by the first chain 216a is blocked by the bottom wall 291 and the rear wall 292 of each side cover 286, thereby preventing the snow from being attached to the carburetor 281. Furthermore, it is possible to prevent deposition of an emulsified matter to be formed by freezing of a mixture of an oil content and a moisture, which emulsified matter tends to be formed at low temperatures less than −3° C. Thus, the icing of the carburetor 281 can be avoided.

The warmed air in the inside area between the side covers 286 is guided by the rear walls 292 of the side covers 286 to reach the air duct 295. Therefore, the warmed air is induced into the air cleaner 282 to thereby suppress entry of snow into the air cleaner 282 and prevent blinding of an element in the air cleaner 282 due to deposition of the snow. This effect may be made more remarkable by extending the side portions of the side covers 286 (as well as the rear walls 292 as required) to the air duct 295.

Figure 47:
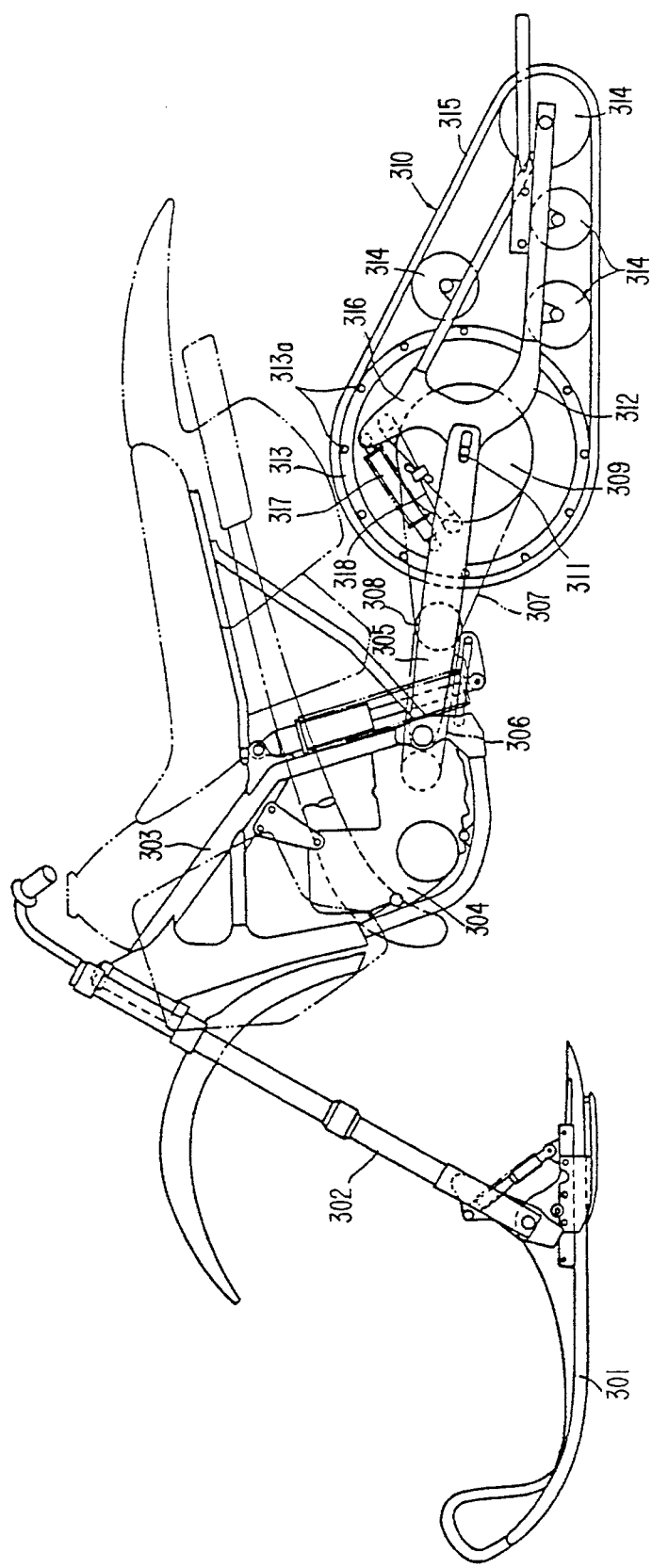
FIG. 47 is a side view of a further embodiment of the present invention.

FIGS. 47 to 57 show a snow vehicle assembled by diverting a vehicle body of a motorcycle as an embodiment of the present invention without modification. FIG. 47 shows a side shape of a skeletal portion of the body. Reference numeral 301 designates a ski; 302 a front fork; 303 a frame; 304 an engine; 305 rear fork; 306, 307 drive chains; 308 an intermediate sprocket, 309 a driven sprocket; and 310 a drive device. The drive device 310 comprises a rear arm 312 having a front end pivotally mounted to the rear end of the rear fork 305 by means of an axle 311, a drive wheel 313 coaxially supported on the axle 311, guide wheels 314 rotatably supported on the rear arm 312, and an endless drive belt 315 passed over the drive wheel 313 and the guide wheels 314. An extension 316 is formed frontwardly of and above the rear arm 312, to which are mounted one ends of a rear sub-cushion 317 and a stopper belt 318, respectively.

Figure 48:
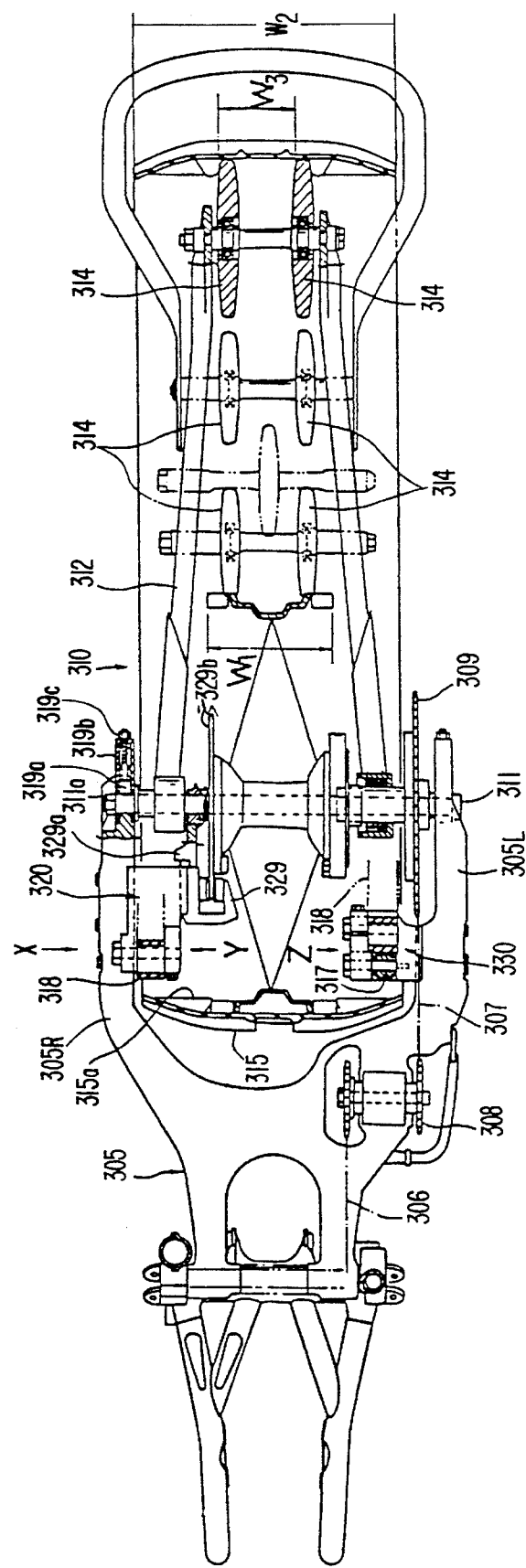
FIG. 48 is a cross-sectional plan of the device of FIG. 47.

FIG. 48 is a view showing the drive belt 315 and other parts in section with respect to a plan of the drive device 310. The axle 311 is a bolt-like member disposed across the rear fork 305 and the rear arm 312. This is tightened at one end by a nut 311a. Outwardly extending pins 313a are equidistantly provided on opposite sides of the drive wheel 313. The pins 313a are engaged with lateral lugs 315a extending widthwise of the body on the inner peripheral surface of the drive belt 315 to transmit power of the engine transmitted to the drive wheel 313 through the drive chains 306 and 307 to the drive belt 315, which can be rotated and driven thereby.

Among a pair of left and right arms constituting a rear fork 305, a right arm 305R and a left arm 305L have a right bracket 320 and a left bracket 330 mounted thereon, respectively. The right bracket 320 and the left bracket 330 have the stopper belt 318 and the rear sub-cushion 317 and the stopper belt 318 mounted thereon, respectively. A slot 319a for supporting the axle 311 movably in a lateral direction is provided in each rear end of the left and right arms 305L and 305r. Opposite ends of the axle 311 passing through the slot 319a extend through a bifurcated chain adjuster 319b holding the rear end of each arm. The chain adjuster 319b is moved forward and backward along with the axle 311 by rotation of the adjust nut 319c to adjust a tension of the drive chain 307.

FIG. 49 is a view showing a mounting state of the stopper belt 318 in a direction as indicated by arrow X of FIG. 48. The stopper belt 318 is formed by bending a single web-like member into a substantially S-letter, wherein opposite ends are locked in its central portion by means of a connector 318a, stretching portions 318b extending in opposite directions are formed into a ring-like configuration, one being passed over a shaft portion 316a formed in the extension 316 of the rear arm 312 while the other being passed over an eccentric cam roller described later formed on the left and right brackets 320 and 330.

FIGS. 50 and 52 are views showing the right bracket 320. FIG. 50 is a view in a direction of arrow Y in FIG. 48. As may be seen from these figures, the right bracket 320 is formed in its outward side with a locating shoulder 321. In the state where the inward side of the right arm 305R is fitted in the shoulder 321, the right bracket 320 and the right arm 305r are connected with each other by means of a bolt 322. A holder portion 323 is extended and formed above the right bracket 320 to be higher than the upper surface of the right arm 305R, and within a circular hole formed in the side thereof is received a circular sliding portion 324a of the adjuster 324, the sliding portion 324a capable of being rolled within the circular hole by means of a rotary shaft 325 provided into he center thereof. A split groove 326 is formed in an annular edge encircling the circular hole of the holder portion 323, the split groove 326 being tightened and adjusted by a bolt 327 so as to allow or prohibit the rolling of the circular sliding portion 324a. The circular sliding portion 324a is integrally provided with an eccentric cam roller 324b formed eccentric with the rotary shaft 325, and one end of the stopper belt 318 is passed over the circumference of the eccentric cam roller 324b.

Furthermore, the right bracket 320 is formed in its inner side (right side of FIG. 51) with a shoulder 328 extending in a longitudinal direction of the rear fork 305, and the side of a brake caliper 329 is engaged with and supported on the shoulder 328. This shoulder 328 is formed to slidably support the brake caliper 329 whose relative position is changed with respect to the rear fork 305 when the tension of the drive chain 307 is adjusted by lateral movement of the position of the axle 311. As shown in FIG. 48 the brake caliper 329 is mounted on the axle 311 through a caliper bracket 329a. Reference numeral 329b designates a disk.

On the other hand, the details of the left bracket 330 are shown in FIGS. 53 to 55. FIG. 53 is a view in a direction of arrow Z of FIG. 48 (here, upper and lower portions are inverted so that the upper side of the body appears on the upper side of the figure). As shown in these figures, the inward side of the left arm 305L is fitted in a shoulder 331 for locating formed on the outer side (left side in FIG. 54) of the left bracket 330, in which state, the left bracket 330 and the left arm 305L are connected with each other by a bolt 332. Within a holder portion 333 constituted similarly to the right bracket 320 is a circular sliding portion 334a of an adjuster 334, said sliding portion 334a capable of being rolled and rotated by a bolt 335 and locked by tightening a split groove 336 by a bolt 337. An end of the stopper belt 318 is passed over the periphery of an eccentric cam roller 334b formed integral with the circular sliding portion 334a.

The left bracket 330 is formed in its extreme end with a recess 338 within which is fitted an extreme end of the rear sub-cushion 317, the rear sub-cushion being pivoted by means of a bolt 339. The rear sub-cushion 317 together with the stopper belt 318 is mounted only on one arm (left arm 305L) of the rear fork 305 through the same bracket 330. Since the brake caliper 329 is mounted on the right arm 305R, the rear sub-cushion 317 and the brake caliper 329 are arranged on the sides opposite to each other.

FIG. 56 is a view partly showing a surface side of the drive belt 315 as an example. The aforesaid surface is formed with a longitudinal rib 340 extending discontinuously in a rotational direction. FIG. 57 is a sectional view of a grounded (snow) portion of the drive belt 315 for explaining the state of cornering. The longitudinal rib 340 is formed externally from the contact portion between the drive wheel 313 or the guide wheels 314 and the drive belt 315. Reference numeral P1 designates a soft snow surface; P2 a hard snow surface; L1 a base line where no longitudinal rib 340 is present; L2 a base line with the longitudinal rib 340; R1 a resistant surface in the hard snow surface where no longitudinal rib is present (the range surrounded by the snow surface P2 and the base line L1); R2 a resistant surface with the longitudinal rib 340 (the range surrounded by the snow surface P2 and the base line L2); and R3 a resistant surface in the soft snow surface where no longitudinal rib is present (the range surrounded by the snow surface P1 and the base line L1). The ratio between the width W2 (FIG. 48) of the drive belt 315 and the width between the pins 313a of the drive wheel 313 or the width W3 (FIG. 48) between the left and right guide wheels 314 and the inner peripheral surface of the drive belt 315 is preferably set in order of W1/W2 and W3/W2=25% to 50%.

The operation of the device according to the present invention will be described hereinafter. When the drive device 310 is moved up and down due to the presence of rugged portions of the road surface, the rear arm 313 oscillates relatively with respect to the rear fork 305 about the axle 311. The oscillation of the rear arm 312 is damped by the rear sub-cushion 317. When the drive device 310 oscillates more than a predetermined angle in the clockwise direction in FIG. 47 and the rear sub-cushion 317 assumes a predetermined elongation, further elongation is prevented by tension of the stopper belt 318. Because of this, the oscillation of the rear arm 312 to the rear fork 305 is defined in a fixed range so that the rear end of the drive device 310 cannot move downwardly into the snow, thus preventing slacking.

The tension of the drive chain 307 is adjusted by untightening the nut 311a fastened to one end of the axle 311, rotating the adjust nut 319c to move the chain adjuster 319b backward together with the axle, for example to tighten the chain 307, at the same time pulling out backward the rear arm 312 with respect to the rear fork 305, and thereafter tightening the nut 311a. At the same time, the connected position between the rear fork 305 and the rear arm 312 is changed, and therefore, the distance between the shaft portion 316a (FIG. 49) of the extension 316 and the center of the eccentric cams 324b and 334b is changed. As a result, the fit of the stopper belt 318 is changed (in the illustrated embodiment the distance is increased as the chain 307 is tensioned). The bolts 327 and 337 of the holders 323 and 333 may be untightened and the rotational shafts 325 and 335 turned. The circular sliding portions 324a and 334a can then be rolled within the holders 323 and 333, respectively. Then, the eccentric cam rollers 324b and 334b may also be rolled to change the adjustment on the stopper belt 318. By this process the distance between the shaft portion 316a and the center of the eccentric cams 324b and 334b is lengthened (in the illustrated embodiment the belt is loosened to an initial setting). Thereafter, the bolts 327 and 337 are again tightened, and the circular sliding portions 324a and 334a are locked immovable within the holders 323 and 333, respectively. The adjustment of the stopper belt 318 is competed.

In the present embodiment, the eccentric cam roller type is used as the adjusters 324 and 334. The adjustment of the stopper belt 318 can be made merely by rotating the adjusters, thus improving a serviceability.

In addition, the adjusters 324 and 334 are mounted on the rear fork 305 instead of the rear arm 312. Therefore, the weight of the rear arm 312 on the movable side can be reduced. Therefore, the road (snow) surface tracking of the rear arm 312 and the whole drive device 310 is enhanced.

Furthermore, in the present embodiment, as shown in FIGS. 56 and 57, a multiplicity of longitudinal ribs 340 are provided in the outer periphery of the drive belt 315, and therefore, the longitudinal ribs 340 are moved into the snow surface (FIG. 57) even at the time of cornering. Thus, a shear resistance of snow is received in a center direction of turning to secure a higher cornering force, rendering easy cornering possible. Particularly where the vehicle performs cornering during running on a hard snow surface P2, the resistant surface R2 of the drive belt 315 provided with the longitudinal ribs 340 is advantageously larger than the resistant surface R1 in the case where no longitudinal rib is present.

Moreover, as previously mentioned, the ratio between the width between the pins 313a or the width W1 between the contact portions between the left and right guide wheels 314 and the inner peripheral surface of the drive belt 3156 and the width W2 of the drive belt 315 is set in the order of W1/W2=25% to 50%. Therefore, when the drive portion 310 is banked in cornering, not only the drive wheel 313 and the guide wheels 314 but also the drive belt 315 are wholly inclined, the lateral (center direction of the cornering) resistant area can be increased to improve the movement of the longitudinal ribs 304 into the snow surface, thus further increasing the cornering force.

It should be understood that, although preferred embodiments of the invention has been illustrated and described herein, changes and modifications can be made in the described arrangement without departing from the scope of the appended claims.

What is claimed is:

1. A saddle-riding snow vehicle comprising a vehicle body including a head pipe at the front end of said vehicle body;

an endless belt;

a rear fork pivotally supported by said vehicle body at the rear end thereof and extending to either side of said endless belt;

an axle mounted to said rear fork;

a drive wheel mounted to said axle, said endless belt extending over said drive wheel, said drive wheel having engaging elements extending laterally therfrom, said endless belt having engage surfaces to receive said engaging elements, said endless belt being substantially under than the width of said drive wheel including said engaging elements, said belt being flexible outwardly of said engaging elements;

a guide wheel, said endless belt extending over said guide wheel and substantially laterally outwardly thereof;

a rear arm connected at the front end of said rear arm to said rear fork, said rear arm extending rearwardly from said rear fork and rotatably mounting said guide wheel at the rear end of said rear arm;

a steering ski;

a front fork pivotally mounted to said head pipe about a steering axis, said steering ski being supported at the lower end of said front fork, said steering ski and said driving wheel being substantially equal in width.

2. The saddle-riding snow vehicle of claim 1 wherein said rear arm is rigidly connected to said rear fork.

3. The saddle-riding type snow vehicle of claim 1 wherein said endless belt is convexly curved outwardly of said guide wheel.

4. The saddle-riding type snow vehicle of claim 1 wherein said endless belt includes a base sheet and a coextensive juxtaposed tread sheet, said base sheet being convex in lateral cross section.

5. The saddle-riding snow vehicle according to claim 1 including a bracket securing said steering ski to said front fork, a pivot axle connecting said bracket to said front fork, said pivot axle having an axis intersecting said steering axis.

6. The saddle-riding snow vehicle according to claim 5 including means forming a cushion between said bracket and said steering ski.

7. The saddle-riding snow vehicle according to claim 6 in which said cushion is formed of a body of elastic material.

8. The saddle-riding snow vehicle according to claim 5 including a shock cushion extending between and mounting said steering ski at one end and said front fork at the other end thereof.

9. The saddle-riding snow vehicle according to claim 1 including longitudinally extending edge members disposed on opposite sides of said steering ski and means for adjustably mounting said edge members with respect to said ski.

10. The saddle-riding snow vehicle according to claim 1 in which said endless belt includes:

a plurality of mutually spaced propelling lugs formed on its exterior surface and extending transversely thereof;

a plurality of core members embedded in a central region of said belt in substantial alignment with said propelling lugs; and a plurality of transversely extending thick-walled members formed on the interior surface of said belt in substantial overlying relation to said propelling lugs.

11. The saddle-riding snow vehicle according to claim 10 including notches formed in each of said thick-walled members to facilitate lateral flexure of said belt.

12. The saddle-riding snow vehicle apparatus according to claim 11 in which said notches are located in said thick-walled members at or exteriorly of the lateral ends of said core members.

13. The saddle-riding snow vehicle according to claim 12 in which said propelling lugs, said core members and said thick-walled members are disposed in substantial mutually aligned relation.

14. The saddle-riding snow vehicle according to claim 10 including means on said driving wheel for engaging said thick-walled members for driving said belt.

15. The saddle-riding snow vehicle according to claim 14 in which said belt driving means comprises:

an annular rim on said driving wheel; and a plurality of driving pins extending in laterally opposite directions from said rim, said pins being disposed in circumferentially spaced relation about the periphery of said rim.

16. The saddle-riding snow vehicle according to claim 9 in which said pins are generally cylindrically formed and are fixedly secured to said rim.

17. The saddle-riding snow vehicle according to claim 1 in which said rear arms are disposed laterally within and are enclosed by said belt.

18. The saddle-riding snow vehicle of claim 1 wherein said drive wheel includes a rim over which said endless belt extends, said rim being constrained to rotate in a plane perpendicular to said axle.

19. A saddle-riding snow vehicle comprising a vehicle body;

an endless belt;

a rear fork pivotally supported by said vehicle body at the rear end thereof and extending to either side of said endless belt;

a rear cushion extending between said rear fork and said vehicle body;

an axle mounted to said rear fork;

a drive wheel mounted to said axle, said endless belt extending over said drive wheel;

a guide wheel, said endless belt extending over said guide wheel and substantially laterally outwardly thereof;

a rear arm connected at the front end of said rear arm to said rear fork and pivotally mounted to said rear fork, said rear arm extending rearwardly from said rear fork and rotatably mounting said guide wheel at the rear end of said rear arm;

a cushion extending between said rear fork and said rear arm to resiliently support said rear arm to said rear fork.

20. The saddle-riding snow vehicle of claim 19 further comprising a stopper belt, said stopper belt extending between said rear fork and said rear arm to limit rotation of said rear arm relative to said rear fork.

21. A saddle-riding snow vehicle comprising a vehicle body;

an endless belt;

a rear fork pivotally supported by said vehicle body at the rear end thereof and extending to either side of said endless belt;

an axle mounted to said rear fork;

a drive wheel mounted to said axle, said endless belt extending over said drive wheel;

a guide wheel, said endless belt extending over said guide wheel and substantially laterally outwardly thereof;

a rear arm connected at the front end of said rear arm to said rear fork, said rear arm extending rearwardly from said rear fork and rotatably mounting said guide wheel at the rear end of said rear arm;

a scraper plate fixed to said rear arm and extending to adjacent said drive wheel at a point about the periphery thereof.

22. A saddle-riding type snow vehicle comprising a vehicle body;

an endless belt including a plurality of mutually spaced propelling lugs formed on its exterior surface and extending transversely thereof, a plurality of core members embedded in a central region of said belt in substantial alignment with said propelling lugs, and a plurality of transversely extending thick-walled members formed on the interior surface of said belt in substantial overlying relation to said propelling lugs;

a rear fork pivotally supported by said vehicle body at the rear end thereof and extending to either side of said endless belt;

an axle mounted to said rear fork;

a drive wheel mounted to said axle, said endless belt extending over said drive wheel, said drive wheel including engaging elements extending laterally therefrom, said endless belt having engaging surfaces to receive said engaging elements, said endless belt being substantially wider than the width of said drive wheel including said engaging elements, said belt being flexible outwardly of said engaging elements;

a rear arm connected at the front end of said rear arm to said rear fork, said rear arm extending rearwardly from said rear fork and rotatably mounting said guide wheel at the rear end of said rear arm;.

a plurality of guide clips attached to the interior surface of said belt, said clips having oppositely spaced, inwardly extending guide arms;

a downwardly extending slide rail fixed with respect to said rear arms for slidingly engaging said clips;

23. The saddle-riding snow vehicle according to claim 22 including a plurality of through-holes forming openings in said belt intermediate said thick-walled members adjacent said core members, and means for attaching of said clips to said core members.

24. A saddle-riding snow vehicle comprising:

a vehicle body;

a rear fork pivotally supported by said vehicle body at the rear end thereof;

an axle mounted to said rear fork;

a driving wheel rotatably supported by said axle mounted to said rear fork;

a pair of oppositely disposed rear arms pivotally supported at their front ends by said axle and rotatably mounting a guide wheel at the rear ends thereof;

at least one cushion extending between said rear fork and a said rear arm; and an endless belt extending between and enclosing said drive wheel and said guide wheel.

25. The saddle-riding snow vehicle according to claim 24 including:

a head pipe at the front end of said vehicle body;

a front fork pivotally mounted in said head pipe; and a steering ski supported by the lower end of said front fork.

26. The saddle-riding snow vehicle according to claim 24 including shock cushions extending between said rear fork and each of said rear arms.

27. The saddle-riding snow vehicle according to claim 26 in which said rear arms comprise frame structures mounting upper and lower guide wheels for said endless belt; and said shock cushions extend upwardly from said rear fork to said rear arms.

28. The saddle-riding snow vehicle according to claim 24 in which said endless belt has a lateral width greater than the axial length of said driving wheel.

29. The saddle-riding snow vehicle according to claim 24 in which said rear fork contains oppositely spaced, rearwardly extending extensions, and said rear arms are disposed laterally interiorly of said rear fork extensions.

30. The saddle-riding snow vehicle according to claim 29 in which said belt has substantially the same lateral dimensions as the lateral space between said rear arms.

31. The saddle-riding snow vehicle according to claim 29 including an engine on said vehicle body, a driven member fixed to said driving wheel on an outer side thereof, means for operatively connecting said driven member to said engine and the rear arm disposed adjacent said driven member being positioned between said driving wheel and said driven member.

32. The saddle-riding snow vehicle according to claim 29 in which said vehicle body is defined by frame members and in which the vertical position of said driving wheel axle is higher than the lowermost of said frame members.

33. The saddle-riding snow vehicle according to claim 32 in which said driving wheel axle and said rear axle mounting said guide wheel are configured to incur substantially equal axle weight.

34. The saddle-riding snow vehicle according to claim 29 including a pair of oppositely extending footrests on said vehicle body, and the lateral width of said rear fork extending not substantially outwardly of the lateral outer ends of said footrests.

35. The saddle-riding snow vehicle according to claim 29 including shock cushions extending between said rear fork and said rear arms, said shock cushions being disposed laterally within and enclosed by said belt.

36. The saddle-riding snow vehicle according to claim 29 including a braking device operatively engageable with said driving wheel, said braking device being mounted within said rear fork and enclosed by said belt.

37. The saddle-riding snow vehicle according to claim 36 in which said braking device comprises a brake disc on said driving wheel, a caliper bracket secured with respect to said rear arms, and a brake caliper mounted on said bracket and operatively engageable with said brake disc.

38. The saddle-riding snow vehicle according to claim 24 including means forming a track belt cover mounted to said rear arms and extending across and covering said belt.

39. The saddle-riding snow vehicle according to claim 38 including means forming discharge openings in said cover for discharging snow from the interior thereof.

40. The saddle-riding snow vehicle according to claim 38 including grab rail means secured to said rear arms.

41. The saddle-riding snow vehicle according to claim 40 in which said grab rail means comprises individual grab rails secured to each of said rear arms.

42. The saddle-riding snow vehicle according to claim 40 in which said grab rail means comprises a grab rail in spaced, overlying relation to said cover and having each of its ends connected to one of said rear arms.

43. The saddle-riding snow vehicle according to claim 40 in which said grab rail means comprises a grab rail disposed in generally spaced horizontal relation With respect to the rear ends of said rear arms and having each of its ends connected to one of said rear arms.

44. A saddle-riding snow vehicle comprising:

a vehicle body;

a rear fork pivotally supported by said vehicle body at the rear end thereof;

an axle mounted to said rear fork;

a driving wheel rotatably supported by said axle mounted to said rear fork;

a pair of oppositely disposed rear arms pivotally supported at their front ends by said axle and rotatably mounting a guide wheel at the rear ends thereof;

an endless belt extending between and enclosing said drive wheel and said guide wheel;

means forming a track belt cover mounted to said rear arms and extending across and covering said belt, said track belt cover including a front cover component secured to said rear fork and a rear cover component in overlapped relation with respect to said front cover component and secured to said rear arms.

45. The saddle-riding snow vehicle according to claim 44 including means forming discharge openings in said front cover component for discharging snow from the interior of said cover.

46. The saddle-riding snow vehicle of claim 24 wherein said drive wheel includes a rim over which said endless belt extends, said rim being constrained to rotate in a plane perpendicular to said axle.

* * * * *

UNITED STATES PATENT AND TRADEMARK OFFICE
CERTIFICATE OF CORRECTION

PATENT NO. : 5,474,146
DATED : December 12, 1995
INVENTOR(S) : YOSHIOKA et al.

It is certified that error appears in the above-indentified patent and that said Letters Patent is hereby corrected as shown below:

In claim 1 (col. 24, l. 50), delete "therfrom" and insert therefor -- therefrom --.

In claim 1 (col. 24, l. 51), delete "engage" and insert therefor -- engaging --.

In claim 1 (col. 24, l. 53), delete "under" and insert therefor -- wider --.

In claim 4 (col. 25, l. 41), delete "type".

In claim 12 (col. 25, l. 40), delete "apparatus".

In claim 16 (col. 25, l. 59), delete "9" and insert therefor -- 15 --.

In claim 22 (col. 26, l. 47), delete "type".

In claim 22 (col. 27, l. 11), delete ";" and insert therefor -- . --.

Signed and Sealed this

Twenty-sixth Day of March, 1996

BRUCE LEHMAN

*Attest:*

*Attesting Officer*   *Commissioner of Patents and Trademarks*